(12) United States Patent  
Sasada

(10) Patent No.: US 6,600,831 B1  
(45) Date of Patent: Jul. 29, 2003

(54) CONNECTION PROCESSING METHOD FOR RADIATION IMAGES

(75) Inventor: Ryoji Sasada, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/531,165

(22) Filed: Mar. 21, 2000

(30) Foreign Application Priority Data

Mar. 23, 1999 (JP) .......................................... 11-078560  
Mar. 23, 1999 (JP) .......................................... 11-078561

(51) Int. Cl.$^7$ ................................................ G06K 9/00
(52) U.S. Cl. ..................................................... 382/132
(58) Field of Search ..................... 382/132; 250/484.3; 378/62, 165, 174

(56) References Cited

U.S. PATENT DOCUMENTS

| 5,111,045 | A | | 5/1992 | Konno et al. ................. 250/589 |
| 5,986,279 | A | * | 11/1999 | Dewaele ........................ 250/582 |
| 6,269,177 | B1 | * | 7/2001 | Dewaele et al. ............. 382/131 |

FOREIGN PATENT DOCUMENTS

| JP | 3-287248 | 12/1991 | ............ G03B/42/02 |
| JP | 3-287249 | 12/1991 | ............ G03B/42/02 |
| JP | 10-268451 | 10/1998 | ............ G03B/42/02 |

* cited by examiner

Primary Examiner—Andrew W. Johns  
Assistant Examiner—Shervin Nakhjavan  
(74) Attorney, Agent, or Firm—Sughrue Mion, PLLC

(57) ABSTRACT

A radiation image of an object is recorded on stimulable phosphor sheets associated with one another such that portions of two adjacent sheets overlap each other. Processing is performed to detect a boundary line image pattern of an overlapping region of a first radiation image read out from a first sheet remote from the object, which first sheet is one of the two adjacent sheets, the overlapping region corresponding to an overlapping area of the first sheet, upon which the other second sheet close to the object overlaps. Positions of two radiation images having been read out from the first and second sheets are matched with each other in accordance with the position of the detected boundary line image pattern in the first radiation image and the position of an edge of an overlapping region of a second radiation image having been read out from the second sheet. Connection processing is then performed on the two radiation images, whose positions have been matched with each other.

24 Claims, 11 Drawing Sheets

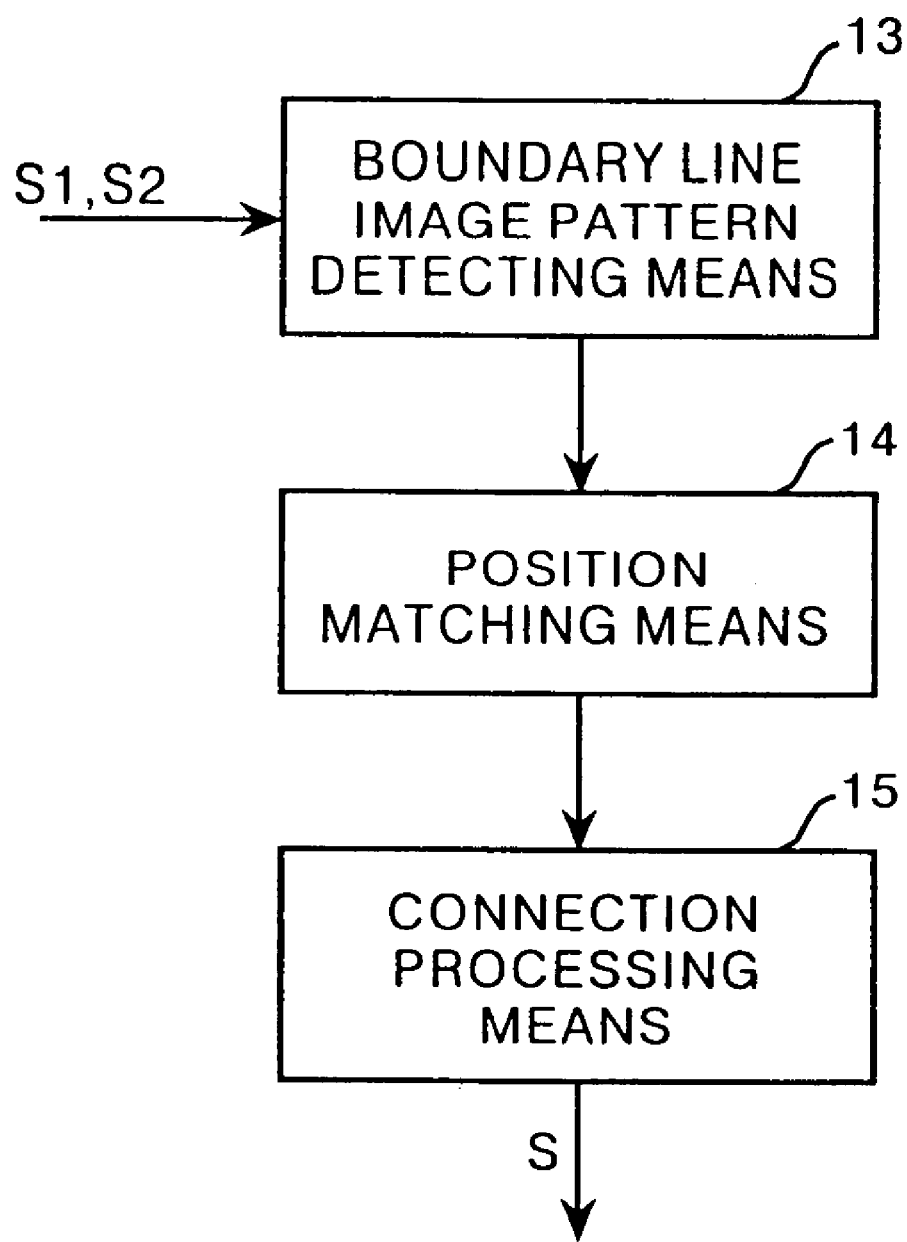

F I G. 7A
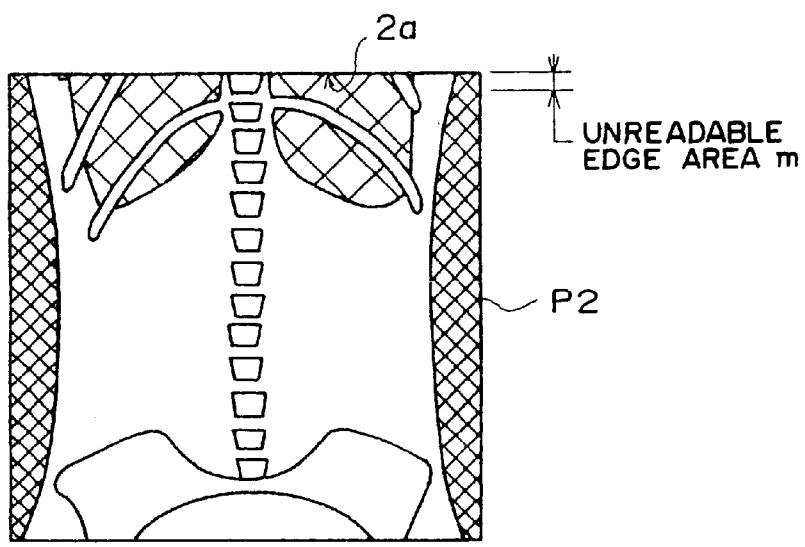
F I G. 7B
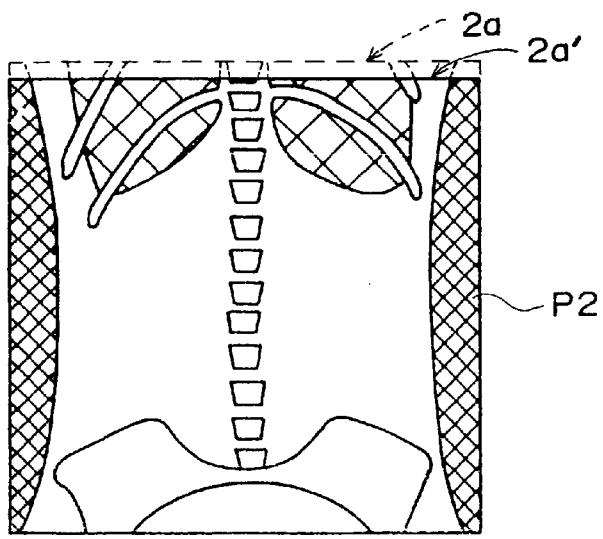

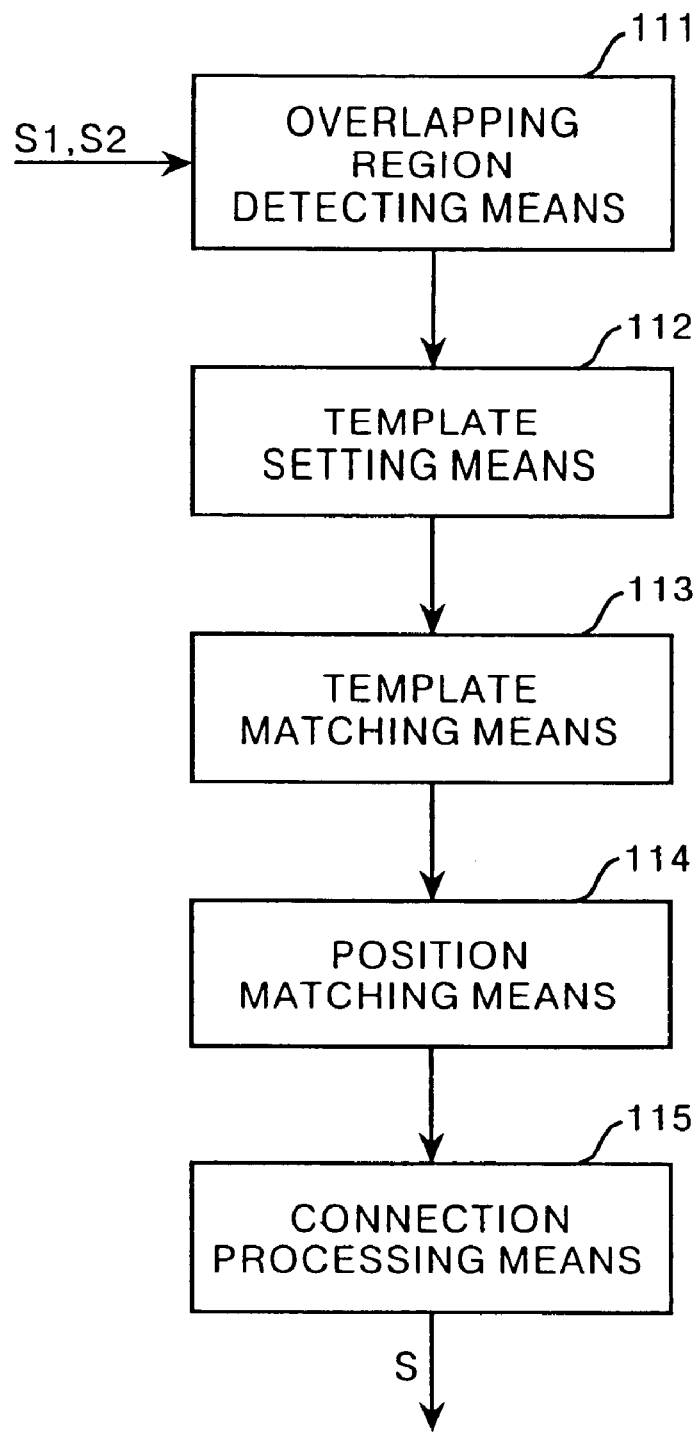

CONNECTION PROCESSING METHOD FOR RADIATION IMAGES

BACKGROUND OF THE INVENTION

1. Field of the Invention

This invention relates to a connection processing method for radiation images and a radiation image processing apparatus for carrying out the method. This invention particularly relates to connection processing for radiation images, which is performed in cases where a radiation image of an object having been recorded on a plurality of stimulable phosphor sheets associated with one another is to be reconstructed.

2. Description of the Prior Art

Recently, as systems capable of obtaining radiation images recorded even when energy intensity of radiation, to which a recording medium is exposed, varies over a wide range, computed radiography systems (CR systems) have widely been used in practice. With the CR systems, a radiation image of an object, such as a human body, is recorded on a stimulable phosphor sheet. The stimulable phosphor sheet, on which the radiation image has been stored, is then exposed to stimulating rays, such as a laser beam, which cause it to emit light in proportion to the amount of energy stored, thereon during its exposure to the radiation. The light emitted by the stimulable phosphor sheet, upon stimulation thereof, is photoelectrically detected and converted into an image signal. The image signal is then processed and used for the reproduction of the radiation image of the object as a visible image on a recording material.

In the CR systems, stimulable phosphor sheets having various different sizes, such as a 14"×17" size, a 14"×14" size, a 10"×12" size, and a 8"×10" size, have heretofore been used in accordance with the objects whose images are to be recorded. However; in the fields of the orthopedic surgery, for the purposes of measuring the degree of bending of the spinal column, and the like, there is a strong demand for the use of a long image ranging from a pattern of the neck to a pattern of the waist as a single image. Therefore, it has been studied to utilize stimulable phosphor sheets which are longer than the aforesaid sizes in a predetermined direction.

However, in cases where the long stimulable phosphor sheets are utilized, designs of radiation image read-out apparatuses for reading out the radiation images from the stimulable phosphor sheets, such as the designs of sheet conveyance paths in the radiation image read-out apparatuses, must be altered markedly so as to be adapted to the long stimulable phosphor sheets. The radiation image read-out apparatuses must thus be designed for the exclusive use for the long stimulable phosphor sheets. Therefore, the problems occur in that the radiation image read-out apparatuses designed for the long stimulable phosphor sheets are disadvantageous in the aspect of cost.

Accordingly, a technique may be utilized, wherein two stimulable phosphor sheets having the conventional sizes are associated with each other to form an apparently long stimulable phosphor sheet, a long image is recorded on the apparently long stimulable phosphor sheet, and thereafter the two stimulable phosphor sheets constituting the apparently long stimulable phosphor sheet are subjected to image read-out operations one after the other. With the technique, the image read-out operations can be performed by utilizing the conventional radiation image read-out apparatus without its design being altered, and the problems described above do not occur.

Also, with the technique described above, three or more stimulable phosphor sheets can be associated with one another to form an;apparently long stimulable phosphor sheet, and a long image of an object can be recorded on the apparently long stimulable phosphor sheet. Also, a plurality of stimulable phosphor sheets can be associated with one another in two axis directions, which are normal to each other, in order to form an apparently wide, long stimulable phosphor sheet, and a wide, long image of an object can be recorded on the apparently wide, long stimulable phosphor sheet. Therefore, the technique described above has good adaptability to objects.

In cases where at least two stimulable phosphor sheets are associated with each other to form an apparently long stimulable phosphor sheet and an image of an object is recorded on the apparently long stimulable phosphor sheet, if the two adjacent stimulable phosphor sheets among the plurality of the stimulable phosphor sheets are considered, the two adjacent stimulable phosphor sheets may be associated with each other such that their edges are in abutment with each other. Alternatively, the two adjacent stimulable phosphor sheets may be associated with each other such that portions of the two sheets overlap each other. However, with the technique wherein the two adjacent stimulable phosphor sheets are associated with each other such that their edges are in abutment with each other, loss of image information will inevitably occurs at the boundary area between the two adjacent stimulable phosphor sheets. With the technique wherein the two adjacent stimulable phosphor sheets are associated with each other such that the portions of the two sheets overlap each other, such loss of image information does not occur.

However, with the technique wherein the two adjacent stimulable phosphor sheets are associated with each other such that the portions of the two sheets overlap each other, each of the two radiation images having been read out from the two stimulable phosphor sheets contains an image pattern of the overlapping area. Therefore, even if the two radiation images having; been read out from the two stimulable phosphor sheets are merely connected with each other without any spacing therebetween, a correct radiation image of the object cannot be reconstructed.

SUMMARY OF THE INVENTION

The primary object of the present invention is to provide a connection processing method for radiation images, wherein radiation images, which have been recorded on a plurality of stimulable phosphor sheets associated with one another with portions of adjacent stimulable phosphor sheets overlapping each other, are read out, positions of the read-out radiation images are accurately matched with one another, and a single radiation image is reconstructed from the read-out radiation images.

Another object of the present invention is to provide a radiation image processing apparatus for carrying out the connection processing method for radiation images.

In cases where two adjacent stimulable phosphor sheets are associated with each other such that portions of the two adjacent stimulable phosphor sheets overlap each other, and radiation carrying image information of an object is irradiated to the two adjacent stimulable phosphor sheets, the overlapping area of one of the two adjacent stimulable phosphor sheets, which is located on the side remote from the object, is exposed to the radiation having decayed to a dose smaller than the dose of the radiation irradiated to the other area, which does not overlap the other stimulable phosphor sheet. Therefore, an image pattern of a boundary line due to a difference in image density is formed between the overlapping area and the non-overlapping area of the stimulable phosphor sheet located on the side remote from the object. A first connection processing method for radiation images and a first radiation image processing apparatus in accordance with the present invention are characterized by detecting the thus formed boundary line image pattern and matching positions of two radiation images with each other by the utilization of the detected boundary line image pattern.

Specifically, the present invention provides a first connection processing method for radiation images, in which a single radiation image of an object is recorded on a plurality of stimulable phosphor sheets associated with one another such that portions of two adjacent stimulable phosphor sheets overlap each other, and in which connection processing is performed on a plurality of radiation images having been read out from the plurality of the stimulable phosphor sheets respectively, such that the single radiation image of the object is reconstructed from the plurality of the read-out radiation images, the method comprising the steps of:

i) detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and ii) performing matching of positions of two radiation images, which have been read out from the two adjacent stimulable phosphor sheets respectively, with each other in accordance with the position of the detected boundary line image pattern in the first radiation image, which has been read out from the first stimulable phosphor sheet located on the side remote from the object, and the position of an edge of an overlapping region of a second radiation image, which has been read out from the second stimulable phosphor sheet located on the side close to the object, the overlapping region of the second radiation image corresponding to the overlapping area of the second stimulable phosphor sheet.

The term "side remote from an object" as used herein means the side remote from the object at the area at which the two adjacent stimulable phosphor sheets overlap each other.

Of the two adjacent stimulable phosphor sheets, the stimulable phosphor sheet remote from the object at the area at which the two adjacent stimulable phosphor sheets overlap each other is herein referred to as the first stimulable phosphor sheet, and the stimulable phosphor sheet close to the object at the area at which the two adjacent stimulable phosphor sheets overlap each other is herein referred to as the second stimulable phosphor sheet. Also, the radiation image having been read out from the first stimulable phosphor sheet is herein referred to as the first radiation image, and the radiation image having been read out from the second stimulable phosphor sheet is herein referred to as the second radiation image.

The term "single radiation image of an object being recorded" as used herein means that one radiation image of the object containing image patterns of backgrounds of the object is recorded, and does not mean that the image of only the object is recorded.

In the first connection processing method for radiation images in accordance with the present invention, the detection of the boundary line image pattern may be performed by performing edge detection processing (such as differentiation processing) on a radiation image signal, which represents the first radiation image having been read out from the first stimulable phosphor sheet located on the side remote from the object.

Also, in the first connection processing method for radiation images in accordance with the present invention, the matching of positions of the two radiation images, which have been read out from the two adjacent stimulable phosphor sheets respectively, with each other is performed in accordance with the position of the boundary line image pattern in the first radiation image, which has been read out from the first stimulable phosphor sheet located on the side remote from the object, and the position of the edge of the overlapping region of the second radiation image, which has been read out from the second stimulable phosphor sheet located on the side close to the object. Specifically, in cases where the second radiation image can be read out from the second stimulable phosphor sheet such that the image information having been recorded at the edge area of the second stimulable phosphor sheet can be read out perfectly, the matching of positions of the two radiation images with each other may be performed such that the position of the edge of the overlapping region of the second radiation image, which has been read out from the second stimulable phosphor sheet located on the side close to the object, coincides with the position of the boundary line image pattern in the first radiation image, which has been read out from the first stimulable phosphor sheet located on the side remote from the object. In cases where the image information having been recorded at the edge area of the second stimulable phosphor sheet cannot be read out perfectly, the matching of positions of the two radiation images with each other may be performed such that the position of the edge of the second radiation image, which has been read out from the second stimulable phosphor sheet located on the side close to the object, coincides with a position in the first radiation image, which position is shifted from the position of the boundary line image pattern in the first radiation image into the overlapping region of the first radiation image by the distance corresponding to the length of the unreadable edge area of the second stimulable phosphor sheet.

Further, in the first connection processing method for radiation images in accordance with the present invention, the connection processing on the radiation images having been read out from the two adjacent stimulable phosphor sheets should preferably be performed such that image signal components of a radiation image signal representing the second radiation image having been read out from the second stimulable phosphor sheet located on the side close to the object, which image signal components correspond to the overlapping region of the second radiation image, are overwritten upon the image signal components of a radiation image signal representing the first radiation image having been read out from the first stimulable phosphor sheet located on the side remote from the object, which image signal components correspond to the overlapping region of the first radiation image. As described above, the overlapping area of the first stimulable phosphor sheet located on the side remote from the object is exposed to a smaller dose of radiation than the dose of the radiation irradiated to the non-overlapping area of the first stimulable phosphor sheet.

Therefore, if the image signal components of the radiation image signal representing the first radiation image, which correspond to the overlapping region of the first radiation image, are utilized in the connection processing, a difference in image density will occur at the area at which the two radiation images are connected. However, in cases where the image signal components of the radiation image signal representing the second radiation image having been read out from the second stimulable phosphor sheet located on the side close to the object, which correspond to the overlapping region of the second radiation image, are utilized in the connection processing, no difference in image density occurs at the area at which the two radiation images are connected.

However, in cases where the image information having been recorded at the edge area of the second stimulable phosphor sheet cannot be read out perfectly, the matching of positions of the two radiation images with each other is performed such that the position of the edge of the second radiation image, which has been read out from the second stimulable phosphor sheet, coincides with the position in the first radiation image, which position is shifted from the position of the boundary line image pattern in the first radiation image into the overlapping region of the first radiation image by the distance corresponding to the length of the unreadable edge area of the second stimulable phosphor sheet. Therefore, as for the unreadable edge area of the second stimulable phosphor sheet, the image signal components of the radiation image signal representing the first radiation image having been read out from the first stimulable phosphor sheet located on the side remote from the object must be utilized. In such cases, in the radiation image reconstructed after the connection processing, the image density of the image region corresponding to the unreadable edge area becomes lower than the image density of the other image region. As for the image region having the image density lower than the image density of the other image region, correction of the image density, e.g. uniform shifting of the image density values to large values, may be performed such that the image density of the image region approximately coincides with the image density of the non-overlapping region of the first radiation image.

In cases where the correction of the image density is made, the connection processing need not necessarily be limited to the aforesaid processing, wherein the image signal components of the radiation image signal representing the second radiation image having been read out from the second stimulable phosphor sheet located on the side close to the object, which correspond to the overlapping region of the second radiation image, are overwritten upon the image signal components of the radiation image signal representing the first radiation image having been read out from the first stimulable phosphor sheet located on the side remote from the object, which correspond to the overlapping region of the first radiation image. Conversely, the connection processing may be performed such that the image signal components of the radiation image signal representing the first radiation image having been read out from the first stimulable phosphor sheet located on the side remote from the object, which correspond to the overlapping region of the first radiation image, are overwritten upon the image signal components of the radiation image signal representing the second radiation image having been read out from the second stimulable phosphor sheet located on the side close to the object, which correspond to the overlapping region of the second radiation image. This is because a substantial difference in time required to perform the correction processing does not occur between when the image density correction is made with respect to only the part (the unreadable edge area) of the overlapping region and when the image density correction is performed with respect to the entire overlapping region. However, since the image information at the overlapping region of the first radiation image has been recorded with a smaller dose of radiation than the dose of radiation with which the second radiation image has been recorded, graininess (noise) characteristics of the overlapping region of the first radiation image are worse than the graininess (noise) characteristics of the second radiation image. Therefore, as for the overlapping region, the image signal components of the radiation image signal representing the second radiation image should preferably be utilized in the connection processing.

In the image recording operation for recording an image of an object on a stimulable phosphor sheet, radiation is produced by a radiation source as a divergent beam and is irradiated to the object. Therefore, the size of the image of the object recorded on the first stimulable phosphor sheet located on the side remote from the object and the size of the image of the object recorded on the second stimulable phosphor sheet are slightly different from each other. The image recorded on the first stimulable phosphor sheet located on the side remote from the object is larger than the image recorded on the second stimulable phosphor sheet located on the side close to the object. Therefore, in cases where there is the risk of the difference between the sizes of the two radiation images, which are to be subjected to the connection processing, adversely affecting the image quality of the reconstructed image, image size enlargement or reduction processing may be performed on the first radiation image having been read out from the first stimulable phosphor sheet located on the side remote from the object and/or the second radiation image having been read out from the second stimulable phosphor sheet located on the side close to the object, such that the sizes of the first radiation image and the second radiation image coincide with each other.

In cases where it cannot be specified previously which one of the two radiation images having been read out from the two adjacent stimulable phosphor sheets is the first radiation image having been read out from the first stimulable phosphor sheet located on the side remote from the object or is the second radiation image having been read out from the second stimulable phosphor sheet located on the side close to the object, the technique described below should preferably be employed for achieving automatic processing. Specifically, edge detection processing is performed on each of two radiation image signals representing the two radiation images having been read out from the two adjacent stimulable phosphor sheets, and it is specified, in accordance with the results of the edge detection processing, which one of the two radiation images is the first radiation image having been read out from the first stimulable phosphor sheet located on the side remote from the object or is the second radiation image having been read out from the second stimulable phosphor sheet located on the side close to the object.

In cases where the technique described above is employed and the number of the stimulable phosphor sheets associated with one another is two, the boundary line image pattern appears only in either one of the two radiation images. Therefore, with the edge detection processing, it can be specified that the radiation image, from which the boundary line image pattern has been detected, is the first radiation image having been read out from the first stimulable phosphor sheet located on the side remote from the object, and that the radiation image, from which no boundary line image pattern has been detected with the edge detection processing, is the second radiation image having been read out from the second stimulable phosphor sheet located on the side close to the object. In cases where the number of the stimulable phosphor sheets associated with one another is larger than two, merely in accordance with the presence or absence of the boundary line image pattern, it cannot be specified which one of the radiation images having been read out from the stimulable phosphor sheets is a radiation image having been read out from a stimulable phosphor sheet located on the side remote from the object or is a radiation image having been read out from a stimulable phosphor sheet located on the side close to the object. However, the overlapping area, at which two adjacent stimulable phosphor sheets overlap each other, can be limited to a restricted area of each stimulable phosphor sheet. Therefore, within the restricted area, the boundary line image pattern appears only in either one of the two radiation images. Accordingly, with the edge detection processing, it can be specified that the radiation image, from which the boundary line image pattern has been detected, is the first radiation image having been read out from the first stimulable phosphor sheet located on the side remote from the object, and that the radiation image, from which no boundary line image pattern has been detected with the edge detection processing, is the second radiation image having been read out from the second stimulable phosphor sheet located on the side close to the object.

The present invention also provides a first radiation image processing apparatus for carrying out the first connection processing method for radiation images in accordance with the present invention. Specifically, the present invention also provides a first radiation image processing apparatus, in which a single radiation image of an object is recorded on a plurality of stimulable phosphor sheets associated with one another such that portions of two adjacent stimulable phosphor sheets overlap each other, and in which connection processing means is provided for performing connection processing on a plurality of radiation images having been read out from the plurality of the stimulable phosphor sheets respectively, such that the single radiation image of the object is reconstructed from the plurality of the read-out radiation images, the apparatus comprising:

i) boundary line image pattern detecting means for detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and ii) position matching means for performing matching of positions of two radiation images, which have been read out from the two adjacent stimulable phosphor sheets respectively, with each other in accordance with the position of the detected boundary line image pattern in the first radiation image, which has been read out from the first stimulable phosphor sheet located on the side remote from the object, and the position of an edge of an overlapping region of a second radiation image, which has been read out from the second stimulable phosphor sheet located on the side close to the object, the overlapping region of the second radiation image corresponding to the overlapping area of the second stimulable phosphor sheet, wherein the connection processing means performs the connection processing on the two radiation images, the positions of which have been matched with each other by the position matching means.

In the first radiation image processing apparatus in accordance with the present invention, the boundary line image pattern detecting means may detect the boundary line image pattern by performing edge detection processing on a radiation image signal, which represents the first radiation image having been read out from the first stimulable phosphor sheet located on the side remote from the object.

Also, in the first radiation image processing apparatus in accordance with the present invention, in cases where the second radiation image can be read out from the second stimulable phosphor sheet such that the image information having been recorded at the edge area of the second stimulable phosphor sheet can be read out perfectly, the position matching means may perform the matching of positions of the two radiation images with each other such that the position of the edge of the overlapping region of the second radiation image, which has been read out from the second stimulable phosphor sheet located on the side close to the object, coincides with the position of the boundary line image pattern in the first radiation image, which has been read out from the first stimulable phosphor sheet located on the side remote from the object. In cases where the image information having been recorded at the edge area of the second stimulable phosphor sheet cannot be read out perfectly, the position matching means may perform the matching of positions of the two radiation images with each other such that the position of the edge of the second radiation image, which has been read out from the second stimulable phosphor sheet located on the side close to the object, coincides with a position in the first radiation image, which position is shifted from the position of the boundary line image pattern in the first radiation image into the overlapping region of the first radiation image by the distance corresponding to the length of the unreadable edge area of the second stimulable phosphor sheet.

Further, in the first radiation image processing apparatus in accordance with the present invention, the connection processing means should preferably perform the connection processing on the radiation images having been read out from the two adjacent stimulable phosphor sheets such that image signal components of a radiation image signal representing the second radiation image having been read out from the second stimulable phosphor sheet located on the side close to the object, which image signal components correspond to the overlapping region of the second radiation image, are overwritten upon the image signal components of a radiation image signal representing the first radiation image having been read out from the first stimulable phosphor sheet located on the side remote from the object, which image signal components correspond to the overlapping region of the first radiation image.

In the image recording operation for recording an image of an object on a stimulable phosphor sheet, radiation is produced by a radiation source as a divergent beam and is irradiated to the object. Therefore, the size of the image of the object recorded on the first stimulable phosphor sheet located on the side remote from the object and the size of the image of the object recorded on the second stimulable phosphor sheet are slightly different from each other. The image recorded on the first stimulable phosphor sheet located on the side remote from the object is larger than the image recorded on the second stimulable phosphor sheet located on the side close to the object. Therefore, in cases where there is the risk of the difference between the sizes of the two radiation images, which are to be subjected to the connection processing, adversely affecting the image quality of the reconstructed image, image size enlargement or reduction processing may be performed on the first radiation image having been read out from the first stimulable phosphor sheet located on the side remote from the object and/or the second radiation image having been read out from the second stimulable phosphor sheet located on the side close to the object, such that the sizes of the first radiation image and the second radiation image coincide with each other.

In cases where it cannot be specified previously which one of the two radiation images having been read out from the two adjacent stimulable phosphor sheets is the first radiation image having been read out from the first stimulable phosphor sheet located on the side remote from the object or is the second radiation image having been read out from the second stimulable phosphor sheet located on the side close to the object, the first radiation image processing apparatus in accordance with the present invention should preferably further comprise radiation image specifying means for performing the technique described below for achieving automatic processing. Specifically, the first radiation image processing apparatus in accordance with the present invention should preferably further comprise radiation image specifying means for:

performing edge detection processing on each of two radiation image signals representing the two radiation images having been read out from the two adjacent stimulable phosphor sheets, and specifying, in accordance with the results of the edge detection processing, which one of the two radiation images is the first radiation image having been read out from the first stimulable phosphor sheet located on the side remote from the object or is the second radiation image having been read out from the second stimulable phosphor sheet located on the side close to the object.

A second connection processing method for radiation images and a second radiation image processing apparatus in accordance with the present invention, in which connection processing is performed on two radiation images having been read out respectively from two adjacent stimulable phosphor sheets, are characterized by performing template matching with respect to overlapping regions of the two radiation images, which overlapping regions correspond to overlapping areas of the two stimulable phosphor sheets, and thereby matching the positions of the two radiation images with each other.

Specifically, the present invention further provides a second connection processing method for radiation images, in which a single radiation image of an object is recorded on a plurality of stimulable phosphor sheets associated with one another such that portions of two adjacent stimulable phosphor sheets overlap each other, and in which connection processing is performed on a plurality of radiation images having been read out from the plurality of the stimulable phosphor sheets respectively, such that the single radiation image of the object is reconstructed from the plurality of the read-out radiation images, the method comprising the steps of:

i) setting at least one subregion within an overlapping region of a radiation image, which has been read out from either one of the two adjacent stimulable phosphor sheets, as a template, the overlapping region corresponding to an overlapping area of the one stimulable phosphor sheet, which overlapping area overlaps an overlapping area of the other stimulable phosphor sheet, ii) searching a subregion, which coincides with the template, within an overlapping region of a radiation image, which has been read out from the other stimulable phosphor sheet, the overlapping region corresponding to the overlapping area of the other stimulable phosphor sheet, and iii) performing matching of positions of the two radiation images with each other such that the thus searched subregion and the template coincide with each other.

In the second connection processing method for radiation images in accordance with the present invention, only one template may be set in the radiation image, which has been read out from either one of the two adjacent stimulable phosphor sheets. Alternatively, a plurality of templates may be set in the radiation image. Such that the reliability of the position matching may be kept high, a plurality of templates should preferably be set. In cases where a plurality of templates are set, different subregions within the overlapping region of the radiation image, which has been read out from the one stimulable phosphor sheet, may be set as the templates. Also, when a plurality of subregions, which coincide with the templates, are searched within the overlapping region of the radiation image, which has been read out from the other stimulable phosphor sheet, the plurality of the subregions may be searched such that the relationship among the positions of the plurality of the templates in the radiation image having been read from the one stimulable phosphor sheet is kept, and such that the plurality of the templates simultaneously coincide with the plurality of the subregions. Further, when the matching of positions of the two radiation images with each other is performed, the position matching may be performed such that all of the templates in the one radiation image and all of the subregions having been searched in the other radiation image simultaneously coincide with each other.

The template may be set within the overlapping region of the first radiation image having been read out from the first stimulable phosphor sheet located on the side remote from the object, and the subregion coinciding with the template may be searched within the overlapping region of the second radiation image having been read out from the second stimulable phosphor sheet located on the side close to the object. Conversely, the template may be set within the overlapping region of the second radiation image, and the subregion coinciding with the template may be searched within the overlapping region of the first radiation image. In cases where a feature image pattern is automatically detected within the overlapping region and the template is set automatically in accordance with the detected feature image pattern as will be described later, since the image information within the overlapping region of the second radiation image has been recorded with a larger dose of radiation than that delivered to the overlapping area of the first stimulable phosphor sheet, the feature image pattern can be detected more accurately from the second radiation image than from the first radiation image. Therefore, the template should preferably be set within the overlapping region of the second radiation image.

In the second connection processing method for radiation images in accordance with the present invention, such that the processing may be kept simple, the overlapping region of the radiation image having been read out from the one stimulable phosphor sheet and the overlapping region of the radiation image having been read out from the other stimulable phosphor sheet should preferably be detected by the steps of:

detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and detecting the overlapping region of the first radiation image and an overlapping region of a second radiation image, which has been read out from the second stimulable phosphor sheet located on the side close to the object, in accordance with the detected boundary line image pattern. The detection of the boundary line image pattern may be performed by performing edge detection processing (such as differentiation processing) on a radiation image signal, which represents the first radiation image having been read out from the first stimulable phosphor sheet located on the side remote from the object. One of techniques for detecting the boundary line image pattern will be described hereinbelow.

Specifically, at the overlapping area, the second stimulable phosphor sheet covers the first stimulable phosphor sheet. Therefore, the overlapping area of the first stimulable phosphor sheet is exposed to a smaller dose of radiation than that delivered to the non-overlapping area of the first stimulable phosphor sheet. Accordingly, in the first radiation image having been read out from the first stimulable phosphor sheet, a difference in image density occurs between the overlapping region, which corresponds to the overlapping area of the first stimulable phosphor sheet, and the non-overlapping region, which corresponds to the non-overlapping area of the first stimulable phosphor sheet. (The term "image density" as used herein means the gray level, the luminous level, and the like, in an image having gradation. The term "image density" as used herein also means the luminance of an image displayed on a display device, such as a cathode ray tube (CRT) display device. In cases where the radiation image is expressed as an image signal, the term "image density" as used herein means the image signal value.) As a result, the boundary line image pattern due to the difference in image density is formed between the overlapping region and the non-overlapping region of the first radiation image. By way of example, the boundary line image pattern can be detected by performing the edge detection processing, such as the differentiation processing, on the image signal representing the first radiation image and along the direction of association of the two stimulable phosphor sheets.

After the boundary line image pattern in the first radiation image has been detected in the manner described above, the region ranging from the boundary line image pattern to the edge of the first radiation image on the side of the overlapping region can be recognized as the overlapping region of the first radiation image. As for the second radiation image, the region extending from the edge of the second radiation image on the side of the overlapping region inwardly by a length, which is equal to the length between the boundary line image pattern in the first radiation image and the edge of the first radiation image on the side of the overlapping region, may be recognized as the overlapping region of the second radiation image. In cases where the second radiation image can be read out from the second stimulable phosphor sheet such that the image information having been recorded at the edge area of the second stimulable phosphor sheet can be read out perfectly, as described above, the overlapping region of the first radiation image and the overlapping region of the second radiation image coincides perfectly with each other. However, in cases where the image information having been recorded at the edge area of the second stimulable phosphor sheet cannot be read out perfectly, the position spaced by the length of the unreadable edge area from the edge of the second stimulable phosphor sheet constitutes the edge of the second radiation image having thus been read out. Therefore, the overlapping region of the first radiation image and the overlapping region of the second radiation image do not necessarily coincide with each other. It often occurs that the overlapping region of the second radiation image becomes narrower by the length of the unreadable edge area than the overlapping region of the first radiation image. Therefore, the range having the length resulting from subtraction of the length, which is equal to the length of the unreadable edge area, from the edge of the second radiation image on the overlapping region side may be recognized as the overlapping region.

One of various subregions within the overlapping region of either one of the radiation images may be set as the template in the overlapping region. In order for the template matching to be performed accurately, a subregion containing a feature image pattern within the overlapping region of the radiation image, which has been read out from the one stimulable phosphor sheet, should preferably be set as the template.

By way of example, in cases where position matching markers formed from a material having a low radiation transmittance are located at the overlapping areas of the two adjacent stimulable phosphor sheets and the image recording operation is performed in this state, the marker image patterns appearing within each of the overlapping regions of the two radiation images may be employed as the feature image pattern. Alternatively, a bone image pattern having a characteristic shape (particularly, an edge area of the bone image pattern), an image pattern of ribs intersecting with each other (particularly, an edge area of the image pattern), a lung image pattern (particularly, an edge area of the lung image pattern), or the like, which appears in the object image, may be employed as the feature image pattern.

The feature image pattern within the overlapping region may be detected automatically in accordance with the image information stored within the overlapping region (i.e., the corresponding image signal components of the radiation image signal representing the radiation image). Alternatively, the operator may make a judgment as to the feature image pattern and may thereby detect it. Also, the template may be set automatically in accordance with the detected feature image pattern. Alternatively, the template may be set manually by the operator. Such that the labor and time required to perform the detection and the setting may be reduced, the detection of the feature image pattern and the setting of the template should preferably be performed automatically. In cases where the feature image pattern is to be detected automatically, a detection algorithm for detecting a predetermined image pattern as the feature image pattern may be stored previously, and the feature image pattern may be detected automatically in accordance with the detection algorithm. In cases where the template is to be set automatically, a template setting algorithm for setting a local area limited region, which has a predetermined shape (a rectangular shape, a circular shape, or the like) and contains a neighboring region of the detected feature image pattern, as the template may be stored previously, and the template may be set automatically in accordance with the template setting algorithm.

Further, in the second connection processing method for radiation images in accordance with the present invention, the connection processing on the radiation images having been read out from the two adjacent stimulable phosphor sheets should preferably be performed such that image signal components of a radiation image signal representing a second radiation image having been read out from a second stimulable phosphor sheet located on the side close to the object, which image signal components correspond to the overlapping region of the second radiation image, are overwritten upon the image signal components of a radiation image signal representing a first radiation image having been read out from a first stimulable phosphor sheet located on the side remote from the object, which image signal components correspond to the overlapping region of the first radiation image. As described above, the overlapping area of the first stimulable phosphor sheet located on the side remote from the object is exposed to a smaller dose of radiation than the dose of the radiation irradiated to the non-overlapping area of the first stimulable phosphor sheet. Therefore, if the image signal components of the radiation image signal representing the first radiation image, which correspond to the overlapping region of the first radiation image, are utilized in the connection processing, a difference in image density will occur at the area at which the two radiation images are connected. However, in cases where the image signal components of the radiation image signal representing the second radiation image having been read out from the second stimulable phosphor sheet located on the side close to the object, which image signal components correspond to the overlapping region of the second radiation image, are utilized in the connection processing, no difference in image density occurs at the area at which the two radiation images are connected.

However, in cases where the image information having been recorded at the edge area of the second stimulable phosphor sheet cannot be read out perfectly, when the matching of positions of the two radiation images with each other is performed, the position of the edge of the second radiation image, which has been read out from the second stimulable phosphor sheet, does not coincide with the position of the boundary line image pattern in the first radiation image. (Specifically, the edge of the second radiation image is located at the position in the first radiation image, which position is shifted from the position of the boundary line image pattern in the first radiation image into the overlapping region of the first radiation image by the distance corresponding to the length of the unreadable edge area of the second stimulable phosphor sheet.) Therefore, as for the unreadable edge area of the second stimulable phosphor sheet, the image signal components of the radiation image signal representing the first radiation image having been read out from the first stimulable phosphor sheet located on the side remote from the object must be utilized. In such cases, in the radiation image reconstructed after the connection processing, the image density of the image region corresponding to the unreadable edge area becomes lower than the image density of the other image region. As for the image region having the image density lower than the image density of the other image region, correction of the image density, e.g. uniform shifting of the image density values to large values, may be performed such that the image density of the image region approximately coincides with the image density of the non-overlapping region of the first radiation image.

As in the first connection processing method for radiation images in accordance with the present invention, in cases where the correction of the image density is made, the connection processing need not necessarily be limited to the aforesaid processing, wherein the image signal components of the radiation image signal representing the second radiation image having been read out from the second stimulable phosphor sheet located on the side close to the object, which image signal components correspond to the overlapping region of the second radiation image, are overwritten upon the image signal components of the radiation image signal representing the first radiation image having been read out from the first stimulable phosphor sheet located on the side remote from the object, which image signal components correspond to the overlapping region of the first radiation image. Conversely, the connection processing may be performed such that the image signal components of the radiation image signal representing the first radiation image having been read out from the first stimulable phosphor sheet located on the side remote from the object, which image signal components correspond to the overlapping region of the first radiation image, are overwritten upon the image signal components of the radiation image signal representing the second radiation image having been read out from the second stimulable phosphor sheet located on the side close to the object, which image signal components correspond to the overlapping region of the second radiation image. However, as described above, as for the overlapping region, the image signal components of the radiation image signal representing the second radiation image should preferably be utilized in the connection processing.

In the image recording operation for recording an image of an object on a stimulable phosphor sheet, radiation is produced by a radiation source as a divergent beam and is irradiated to the object. Therefore, the size of the image of the object recorded on the first stimulable phosphor sheet located on the side remote from the object and the size of the image of the object recorded on the second stimulable phosphor sheet are slightly different from each other. The size of the first radiation image becomes larger than the size of the second radiation image. Therefore, in cases where there is the risk of the difference between the sizes of the two radiation images, which are to be subjected to the connection processing, adversely affecting the image quality of the reconstructed image, image size enlargement or reduction processing may be performed on the first radiation image and/or the second radiation image, such that the sizes of the first radiation image and the second radiation image coincide with each other.

Also, as in the first connection processing method for radiation images in accordance with the present invention, in cases where it cannot be specified previously which one of the two radiation images having been read out from the two adjacent stimulable phosphor sheets is the first radiation image having been read out from the first stimulable phosphor sheet located on the side remote from the object or is the second radiation image having been read out from the second stimulable phosphor sheet located on the side close to the object, the technique described below should preferably be employed for achieving automatic processing. Specifically, edge detection processing is performed on each of two radiation image signals representing the two radiation images having been read out from the two adjacent stimulable phosphor sheets, and it is specified, in accordance with the results of the edge detection processing, which one of the two radiation images is a first radiation image having been read out from a first stimulable phosphor sheet located on the side remote from the object or is a second radiation image having been read out from a second stimulable phosphor sheet located on the side close to the object.

The present invention still further provides a second radiation image processing apparatus for carrying out the second connection processing method for radiation images in accordance with the present invention. Specifically, the present invention still further provides a second radiation image processing apparatus, in which a single radiation image of an object is recorded on a plurality of stimulable phosphor sheets associated with one another such that portions of two adjacent stimulable phosphor sheets overlap each other, and in which connection processing means is provided for performing connection processing on a plurality of radiation images having been read out from the plurality of the stimulable phosphor sheets respectively, such that the single radiation image of the object is reconstructed from the plurality of the read-out radiation images, the apparatus comprising:

i) template setting means for setting at least one subregion within an overlapping region of a radiation image, which has been read out from either one of the two adjacent stimulable phosphor sheets, as a template, the overlapping region corresponding to an overlapping area of the one stimulable phosphor sheet, which overlapping area overlaps an overlapping area of the other stimulable phosphor sheet, ii) template matching means for searching a subregion, which coincides with the template, within an overlapping region of a radiation image, which has been read out from the other stimulable phosphor sheet, the overlapping region corresponding to the overlapping area of the other stimulable phosphor sheet, and iii) position matching means for performing matching of positions of the two radiation images with each other such that the thus searched subregion and the template coincide with each other.

In the second radiation image processing apparatus in accordance with the present invention, the template setting means may set only one template in the radiation image, which has been read out from either one of the two adjacent stimulable phosphor sheets. Alternatively, the template setting means may set a plurality of templates in the radiation image. Such that the reliability of the position matching may be kept high, a plurality of templates should preferably be set.

The second radiation image processing apparatus in accordance with the present invention should preferably further comprise overlapping region detecting means for:

detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and detecting the overlapping region of the first radiation image and an overlapping region of a second radiation image, which has been read out from the second stimulable phosphor sheet located on the side close to the object, in accordance with the detected boundary line image pattern. In such cases, the overlapping region detecting means should preferably detect the boundary line image pattern by performing edge detection processing on a radiation image signal, which represents the first radiation image having been read out from the first stimulable phosphor sheet located on the side remote from the object.

The template setting means should preferably set a subregion containing a feature image pattern within the overlapping region of the radiation image, which has been read out from the one stimulable phosphor sheet, as the template.

Such that the labor and time required to perform the detection and the setting may be reduced, the template setting means should preferably be constituted such that it automatically detects the feature image pattern (in accordance with image information stored within the overlapping region of the radiation image, which has been read out from the one stimulable phosphor sheet) and automatically sets the template in accordance with the detected feature image pattern.

Also, in the second radiation image processing apparatus in accordance with the present invention, the connection processing means should preferably perform the connection processing on the radiation images having been read out from the two adjacent stimulable phosphor sheets such that image signal components of a radiation image signal representing a second radiation image having been read out from a second stimulable phosphor sheet located on the side close to the object, which image signal components correspond to the overlapping region of the second radiation image, are overwritten upon the image signal components of a radiation image signal representing a first radiation image having been read out from a first stimulable phosphor sheet located on the side remote from the object, which image signal components correspond to the overlapping region of the first radiation image. In such cases, a radiation image having uniform image density can be obtained from the connection processing.

Further, in cases where it cannot be specified previously which one of the two radiation images having been read out from the two adjacent stimulable phosphor sheets is the first radiation image having been read out from the first stimulable phosphor sheet located on the side remote from the object or is the second radiation image having been read out from the second stimulable phosphor sheet located on the side close to the object, the second radiation image processing apparatus in accordance with the present invention should preferably further comprise radiation image specifying means for performing the technique described below for achieving automatic processing. Specifically, the second radiation image processing apparatus in accordance with the present invention should preferably further comprise radiation image specifying means for:

performing edge detection processing on each of two radiation image signals representing the two radiation images having been read out from the two adjacent stimulable phosphor sheets, and specifying, in accordance with the results of the edge detection processing, which one of the two radiation images is a first radiation image having been read out from a first stimulable phosphor sheet located on the side remote from the object or is a second radiation image having been read out from a second stimulable phosphor sheet located on the side close to the object.

In cases where two adjacent stimulable phosphor sheets are associated with each other such that portions of the two adjacent stimulable phosphor sheets overlap each other, and radiation carrying image information of an object is irradiated to the two adjacent stimulable phosphor sheets, the overlapping area of: the first stimulable phosphor sheet, which is located on the side remote from the object, is exposed to the radiation having decayed to a dose smaller than the dose of the radiation irradiated to the other area, which does not overlap the second stimulable phosphor sheet. Therefore, a difference in image density occurs and the image pattern of the boundary line is formed between the overlapping area and the non-overlapping area of the first stimulable phosphor sheet located on the side remote from the object. With the first connection processing method for radiation images and the first radiation image processing apparatus in accordance with the present invention, the thus formed boundary line image pattern is detected, and the overlapping areas of the two adjacent stimulable phosphor sheets can be specified. Also, the connection processing is performed on the two radiation images, which have been read out from the two adjacent stimulable phosphor sheets respectively, in accordance with the position of the detected boundary line image pattern in the first radiation image, which has been read out from the first stimulable phosphor sheet located on the side remote from the object, and the position of the edge of the overlapping region of the second radiation image, which has been read out from the second stimulable phosphor sheet located on the side close to the object. Therefore, the two radiation images can be connected with each other such that their overlapping regions may overlap each other. Further, even if markers for position matching are not used in the image recording operation, the positions of the radiation images can be accurately matched with each other, and a single connected radiation image can thus be reconstructed from the radiation images.

With the second connection processing method for radiation images and the second radiation image processing apparatus in accordance with the present invention, at least one subregion within the overlapping region of the radiation image, which has been read out from either one of the two adjacent stimulable phosphor sheets, is set as the template, the overlapping region corresponding to the overlapping area of the one stimulable phosphor sheet, which overlapping area overlaps the overlapping area of the other stimulable phosphor sheet. Also, the subregion, which coincides with the template, is searched within the overlapping region of the radiation image, which has been read out from the other stimulable phosphor sheet, the overlapping region corresponding to the overlapping area of the other stimulable phosphor sheet. Thereafter, the matching of positions of the two radiation images with each other is performed such that the thus searched subregion and the template coincide with each other. Therefore, the advantages over the technique, wherein the two adjacent radiation images are merely connected with each other such that any gap may not occur therebetween, can be obtained in that the positions of the two radiation images can be accurately matched with each other and, as a result, a correct radiation image can be reconstructed.

Also, with the second connection processing method for radiation images and the second radiation image processing apparatus in accordance with the present invention, the template matching is performed within the limited region, i.e. within the overlapping region. Therefore, the time required to perform the template matching processing can be kept short. Further, since the template matching is performed within the narrow region, the accuracy with which the template matching is performed can be kept high.

BRIEF DESCRIPTION OF THE DRAWINGS

FIG. 6 is a block diagram showing a different embodiment of the first radiation image processing apparatus in accordance with the present invention, FIG. 7A is a schematic view showing a second radiation image having been recorded on the second stimulable phosphor sheet shown in FIG. 2, FIG. 7B is an explanatory view showing how part of image information stored at an overlapping area of the second stimulable phosphor sheet is lost in an image read-out operation in cases where image information having been recorded at an edge area of the second stimulable phosphor sheet cannot be read out perfectly, FIG. 9 is a block diagram showing an embodiment of the second radiation image processing apparatus for carrying out the second connection processing method for radiation images in accordance with the present invention.

DESCRIPTION OF THE PREFERRED EMBODIMENTS

The present invention will hereinbelow be described in further detail with reference to the accompanying drawings.

Figure 1:
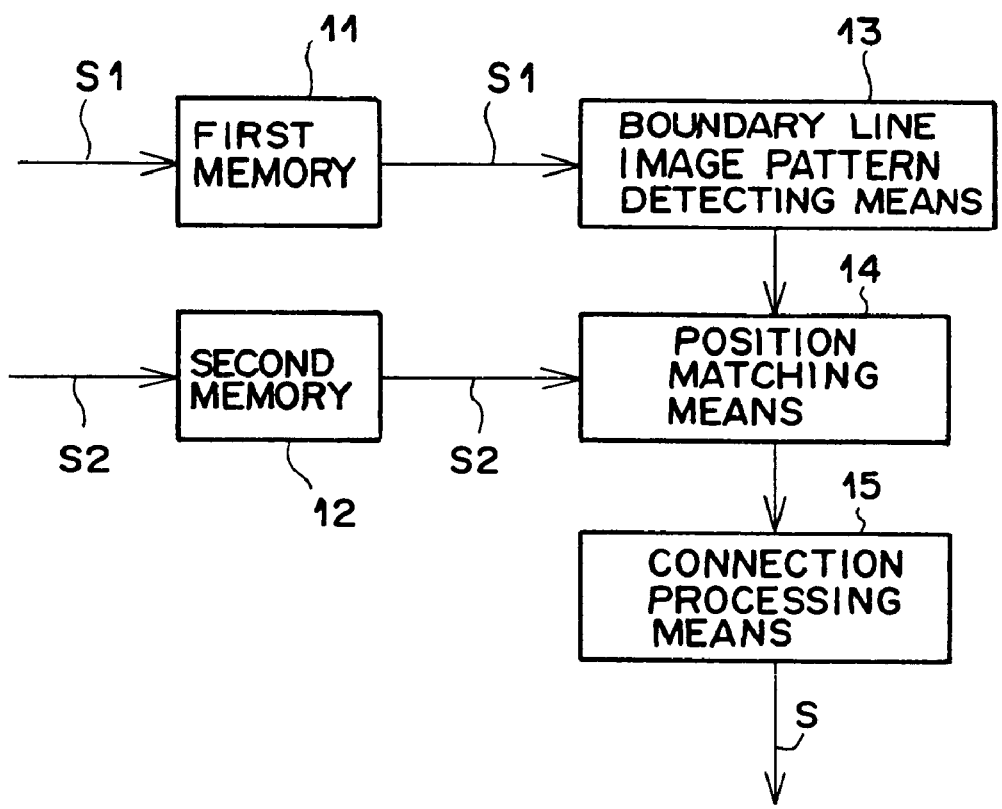
FIG. 1 is a block diagram showing an embodiment of the first radiation image processing apparatus for carrying out the first connection processing method for radiation images in accordance with the present invention.
Figure 2:
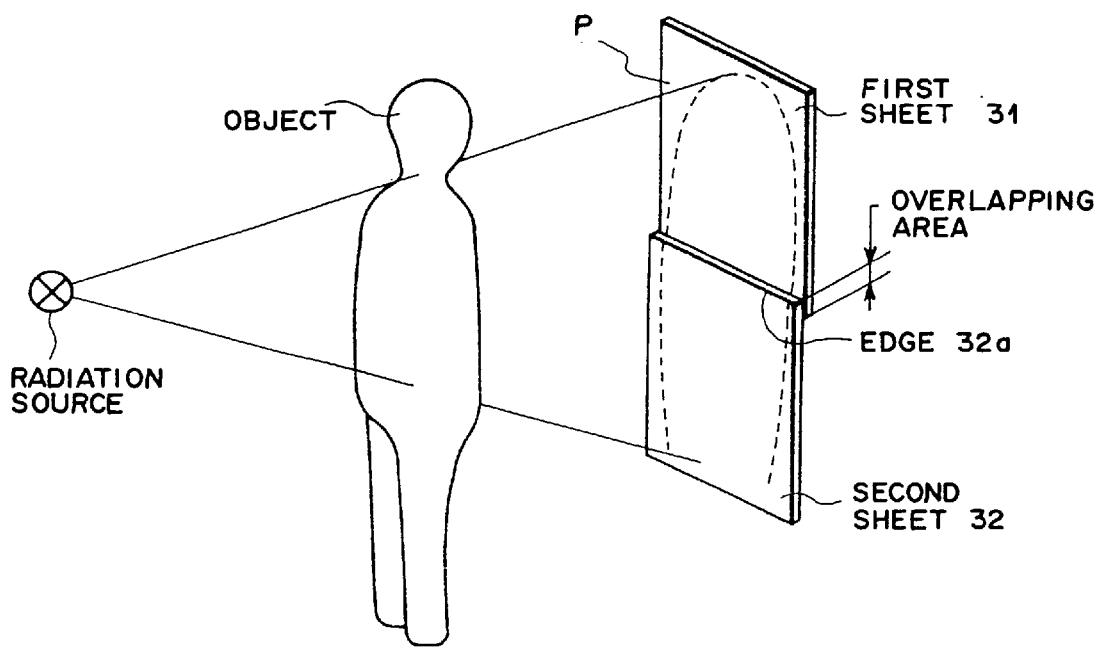
FIG. 2 is a perspective view showing how a single radiation image of an object is recorded on two adjacent stimulable phosphor sheets, portions of which overlap each other.
Figure 3A:
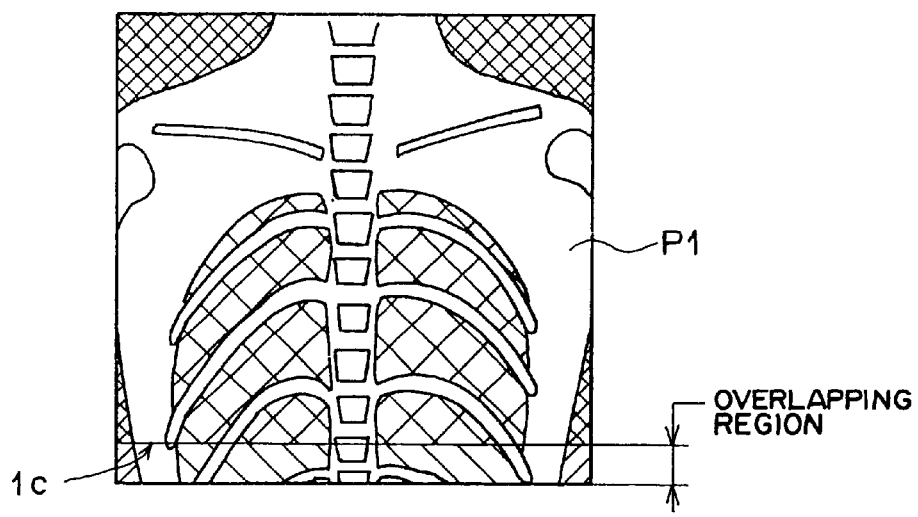
FIG. 3A is a schematic view showing a first radiation image having been read out from a first stimulable phosphor sheet, which is one of the two adjacent stimulable phosphor sheets shown in FIG. 2 and which is located on the side remote from the object.
Figure 3B:
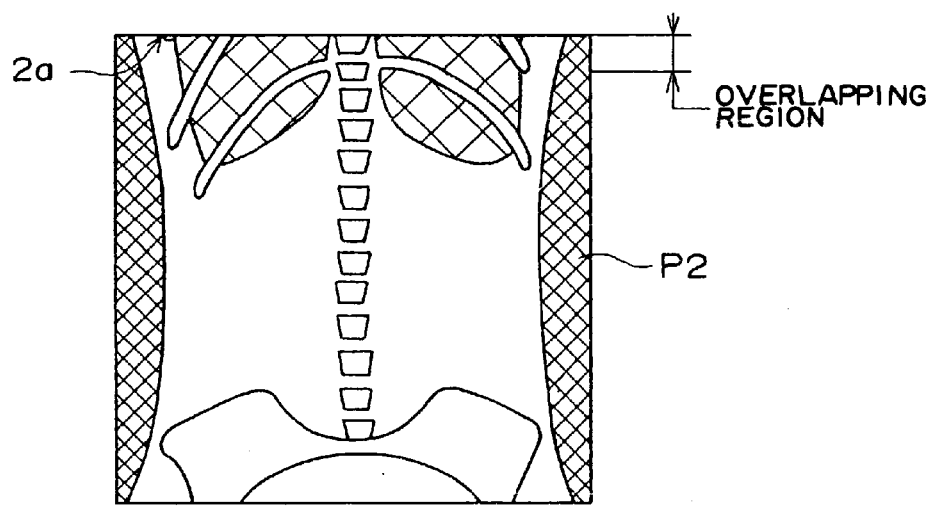
FIG. 3B is a schematic view showing a second radiation image having been read out from the other second stimulable phosphor sheet shown in FIG. 2, which is located on the side close to the object.

FIG. 1 is a block diagram showing an embodiment of the first radiation image processing apparatus for carrying out the first connection processing method for radiation images in accordance with the present invention. FIG. 2 is a perspective view showing how a single radiation image of an object is recorded on two adjacent stimulable phosphor sheets, portions of which overlap each other. FIG. 3A is a schematic view showing a first radiation image having been read out from a first stimulable phosphor sheet, which is one of the two adjacent stimulable phosphor sheets shown in FIG. 2 and which is located on the side remote from the object. FIG. 3B is a schematic view showing a second radiation image having been read out from the other second stimulable phosphor sheet shown in FIG. 2, which is located on the side close to the object. The first and second radiation images shown in FIGS. 3A and 3B are subjected to connection processing performed in the embodiment of FIG. 1.

In the embodiment of the first radiation image processing apparatus in accordance with the present invention, as illustrated in FIG. 2, a single radiation image P of an object is recorded on two adjacent stimulable phosphor sheets 31 and 32 associated with one another such that portions of the stimulable phosphor sheets 31 and 32 overlap each other. A first radiation image P1 is read out from the first stimulable phosphor sheet 31 located on the side remote from the object, and a second radiation image P2 is read out from the second stimulable phosphor sheet 32 located on the side close to the object. Also, connection processing is performed on a first radiation image signal S1, which represents the first radiation image P1, and a second radiation image signal S2, which represents the second radiation image P2, such that the radiation image P of the object is reconstructed from the first radiation image P1 and the second radiation image P2. The radiation image processing apparatus comprises a first memory 11 for storing the first radiation image signal S1, which has been read out from the first stimulable phosphor sheet 31 located on the side remote from the object, and a second memory 12 for storing the second radiation image signal S2, which has been read out from the second stimulable phosphor sheet 32 located on the side close to the object. The radiation image processing apparatus also comprises boundary line image pattern detecting means 13 for detecting a boundary line image pattern 1c (shown in FIG. 3A) of an overlapping region of the first radiation image P1 having been read out from the first stimulable phosphor sheet 31, the overlapping region corresponding to an overlapping area of the first stimulable phosphor sheet 31, which overlapping area overlaps an overlapping area of the second stimulable phosphor sheet 32. The boundary line image pattern is detected in accordance with the first radiation image signal S1. The radiation image processing apparatus further comprises position matching means 14 for performing matching of positions of the first radiation image P1 and the second radiation image P2 with each other, such that the position of the detected boundary line image pattern 1c in the first radiation image P1 and the position of an edge 2a of an overlapping region of the second radiation image P2, the overlapping region of the second radiation image P2 corresponding to the overlapping area of the second stimulable phosphor sheet 32, may coincide with each other. The radiation image processing apparatus still further comprises connection processing means 15 for performing the connection processing on the first radiation image P1 and the second radiation image P2, the positions of which have been matched with each other by the position matching means 14, and thereby forming the single radiation image P. (Specifically, the connection processing is performed on the first radiation image signal S1 and the second radiation image signal S2, which respectively represent the first radiation image P1 and the second radiation image P2, the positions of which have been matched with each other by the position matching means 14, and a radiation image signal S representing the single radiation image P is thereby formed.)

Figure 4A:
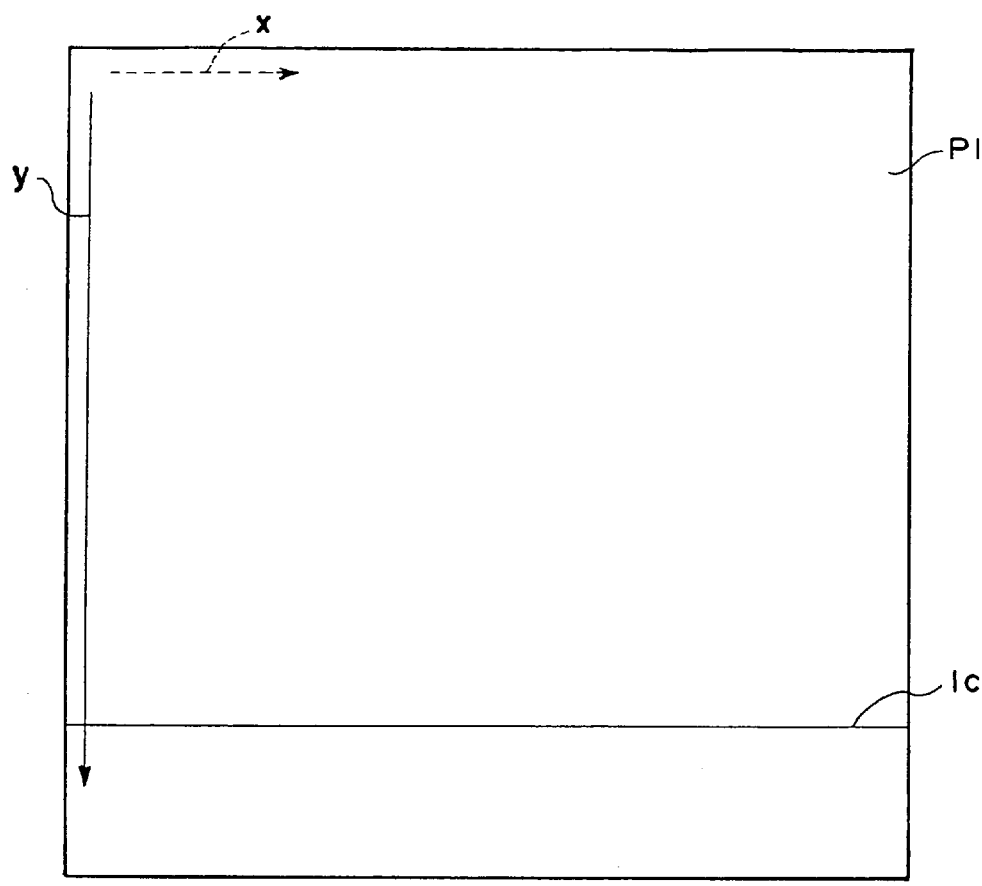
FIG. 4A is an explanatory view showing how boundary line image pattern detecting means detects a boundary line image pattern in the first radiation image shown in FIG. 3A.
Figure 4B:
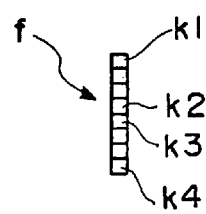
FIG. 4B is an explanatory view showing a filter employed in the boundary line image pattern detecting means.

The boundary line image pattern detecting means 13 detects the boundary line image pattern 1c, which appears in the first radiation image P1, in accordance with the first radiation image signal S1 in the manner described below. Specifically, as illustrated in FIG. 4B, a filter f having a size of eight pixels (arrayed in the vertical direction) x one pixel (in the horizontal direction) is employed. As illustrated in FIG. 4A, the filter f is shifted for each pixel in the first radiation image P1 along the direction indicated by the arrow X, which direction is normal to the direction indicated by the arrow Y along which the first radiation image P1 and the second radiation image P2 are to be connected with each other. In each step of the shifting, the values of the first radiation image signal S1 representing the first radiation image P1, which correspond respectively to a first pixel k1, a fourth pixel k2, a fifth pixel k3, and an eighth pixel k4 of the filter f, are detected. (The value of the first radiation image signal S1 corresponding to k1 will herein be represented by K1. The value of the first radiation image signal S1 corresponding to k2 will be represented by K2. The value of the first radiation image signal S1 corresponding to k3 will be represented by K3. Also, the value of the first radiation image signal S1 corresponding to k4 will be represented by K4.) From the thus detected values K1, K2, K3, and K4 of the first radiation image signal S1, an evaluation value M is calculated with Logical Expression (1) shown below.

$$\text{if } \{(K1>K4) \text{ and } (K2>K3)\} \text{ then } M=M+1 \text{ else if } \{(K1<K4) \text{ and } (K2<K3)\} \text{ then } M=M-1 \text{ else } M=M\pm0 \qquad (1)$$

Specifically, in cases where the signal value K1 corresponding to the first pixel k1 is larger than the signal value K4 corresponding to the eighth pixel k4 (i.e., the image density at the first pixel k1 is higher than the image density at the eighth pixel k4 and, at the same time, the signal value K2 corresponding to the fourth pixel k2 is larger than the signal value K3 corresponding to the fifth pixel k3 (i.e., the image density at the fourth pixel k2 is higher than the image density at the fifth pixel k3), there is a strong probability that the boundary line image pattern 1c, at which the image density changes largely, will be located between the pixels corresponding to the fourth pixel k2 and the fifth pixel k3. Therefore, in such cases, a value of +1 is added to the evaluation value M. In cases where the signal value k1 corresponding to the first pixel k1 is smaller than the signal value K4 corresponding to the eighth pixel k4 and, at the same time, the signal value K2 corresponding to the fourth pixel k2 is smaller than the signal value K3 corresponding to the fifth pixel k3, since the state of change in image density is reverse to that at the boundary line image pattern 1c, a value of −1 is added to the evaluation value M. In the other cases, the evaluation value M is not changed (i.e., M=M±0).

Also, the evaluation value M obtained when the filter f has been shifted along the direction indicated by the arrow X from one side edge to the other side edge of the first radiation image P1 is taken as the evaluation value M for the line extending along the direction indicated by the arrow X.

Thereafter, the filter f is shifted by one pixel along the direction indicated by the arrow Y, and the operation described above is iterated. In this manner, the evaluation value M for the next line shifted by one pixel from the line described above is calculated. In the same manner, the filter f is shifted for each pixel along the direction indicated by the arrow Y, and the evaluation value M for each line is calculated. It may be regarded that, along a line at which the evaluation value M is positive and takes the maximum value, the boundary line image pattern 1c is located between the fourth pixel k2 and the fifth pixel k3 of the filter f.

The detection of the boundary line image pattern 1c with the algorithm described above is efficient in cases where the boundary line image pattern 1c appears as a pattern approximately parallel to the upper edge or the lower edge of the first radiation image P1. However, in cases where the boundary line image pattern 1c has an inclination with respect to the upper edge or the lower edge of the first radiation image P1, the evaluation value M takes an identical value over several lines, and the boundary line image pattern 1c cannot be specified with the algorithm described above.

In cases where the boundary line image pattern 1c has an inclination with respect to the upper edge or the lower edge of the first radiation image P1, in the range of the several lines, for which the evaluation value M takes an identical value, the boundary line image pattern 1c may be searched at a point in the vicinity of the right side edge of the first radiation image P1 and a point in the vicinity of the left side edge of the first radiation image P1. Part of the boundary line image pattern 1c, which has been detected in the vicinity of the right side edge of the first radiation image P1, and part of the boundary line image pattern 1c, which has been detected in the vicinity of the left side edge of the first radiation image P1, may then be connected with each other by a straight line, and the boundary line image pattern 1c may thereby be detected.

Alternatively, in order for the boundary line image pattern 1c to be detected, edge detection processing with differentiation processing may be performed, wherein evaluation is made from only the difference (K2–K3) between the signal value K2 corresponding to the fourth pixel k2 and the signal value K3 corresponding to the fifth pixel k3. However, such edge detection is apt to be affected by noise or the recorded image information itself. Therefore, such that the boundary line image pattern 1c may be detected accurately, the evaluation with the vertically long filter f should preferably be performed.

In cases where the edge detection processing is to be performed, a technique described below may be employed. Specifically, the gradient of the image density (the first radiation image signal S1) between two vertically adjacent pixels in the first radiation image P1 is calculated with respect to each set of two pixels adjacent to each other along the direction indicated by the arrow Y. Two adjacent pixels, at which the image density of the upper pixel in FIG. 4A is higher than the image density of the lower pixel, are detected as a candidate for the position of the boundary line image pattern 1c. Thereafter, the searching position is shifted by one pixel along the direction, which is normal to the direction indicated by the arrow Y, and the searching along the direction indicated by the arrow Y is performed in the same manner as that described above. The line, which extends along the direction indicated by the arrow X approximately normal to the direction indicated by the arrow Y and on which the largest number of the candidates for the position of the boundary line image pattern 1c are distributed, is detected as the boundary line image pattern 1c. As another alternative, the boundary line image pattern 1c may be detected by the utilization of Hough transform.

The connection processing means 15 performs the connection processing on the first radiation image signal S1 and the second radiation image signal S2, which respectively represent the first radiation image P1 and the second radiation image P2, the positions of which have been matched with each other by the position matching means 14. In the connection processing, as for the overlapping regions of the first radiation image P1 and the second radiation image P2, the image signal components of the second radiation image signal S2 representing the second radiation image P2, which correspond to the overlapping region of the second radiation image P2, are employed. As for the non-overlapping region of the first radiation image P1, the image signal components of the first radiation image signal S1, which correspond to the non-overlapping region of the first radiation image P1, are employed. Also, as for the non-overlapping region of the second radiation image P2, the image signal components of the second radiation image signal S2, which correspond to the non-overlapping region of the second radiation image P2, are employed.

How this embodiment of the first radiation image processing apparatus in accordance with the present invention operates will be described hereinbelow.

Firstly, as illustrated in FIG. 2, the radiation image P of the object is recorded on the first stimulable phosphor sheet 31 and the second stimulable phosphor sheet 32. The first radiation image P1 is read out from the first stimulable phosphor sheet 31, and the second radiation image P2 is read out from the second stimulable phosphor sheet 32. Of the two radiation image signals S1 and S2 representing the first radiation image P1 and the second radiation image P2 respectively, the first radiation image signal S1 representing the first radiation image P1 is stored in the first memory 11, and the second radiation image signal S2 representing the second radiation image P2 is stored in the second memory 12.

Thereafter, the boundary line image pattern detecting means 13 reads the first radiation image signal S1 from the first memory 11. In the manner described above, in accordance with the first radiation image signal S1, the boundary line image pattern detecting means 13 detects the boundary line image pattern 1c of the overlapping region of the first radiation image P1, the overlapping region corresponding to the overlapping area of the first stimulable phosphor sheet 31, which overlapping area overlaps the overlapping area of the second stimulable phosphor sheet 32.

The position matching means 14 then reads the second radiation image signal S2 from the second memory 12. The position matching means 14 performs the matching of the positions of the first radiation image P1 and the second radiation image P2 with each other, such that the position of the detected boundary line image pattern 1c in the first radiation image P1 and the position of the edge 2a of the overlapping region of the second radiation image P2, the overlapping region of the second radiation image P2 corresponding to the overlapping are a of the second stimulable phosphor sheet 32, may coincide with each other.

Figure 5:
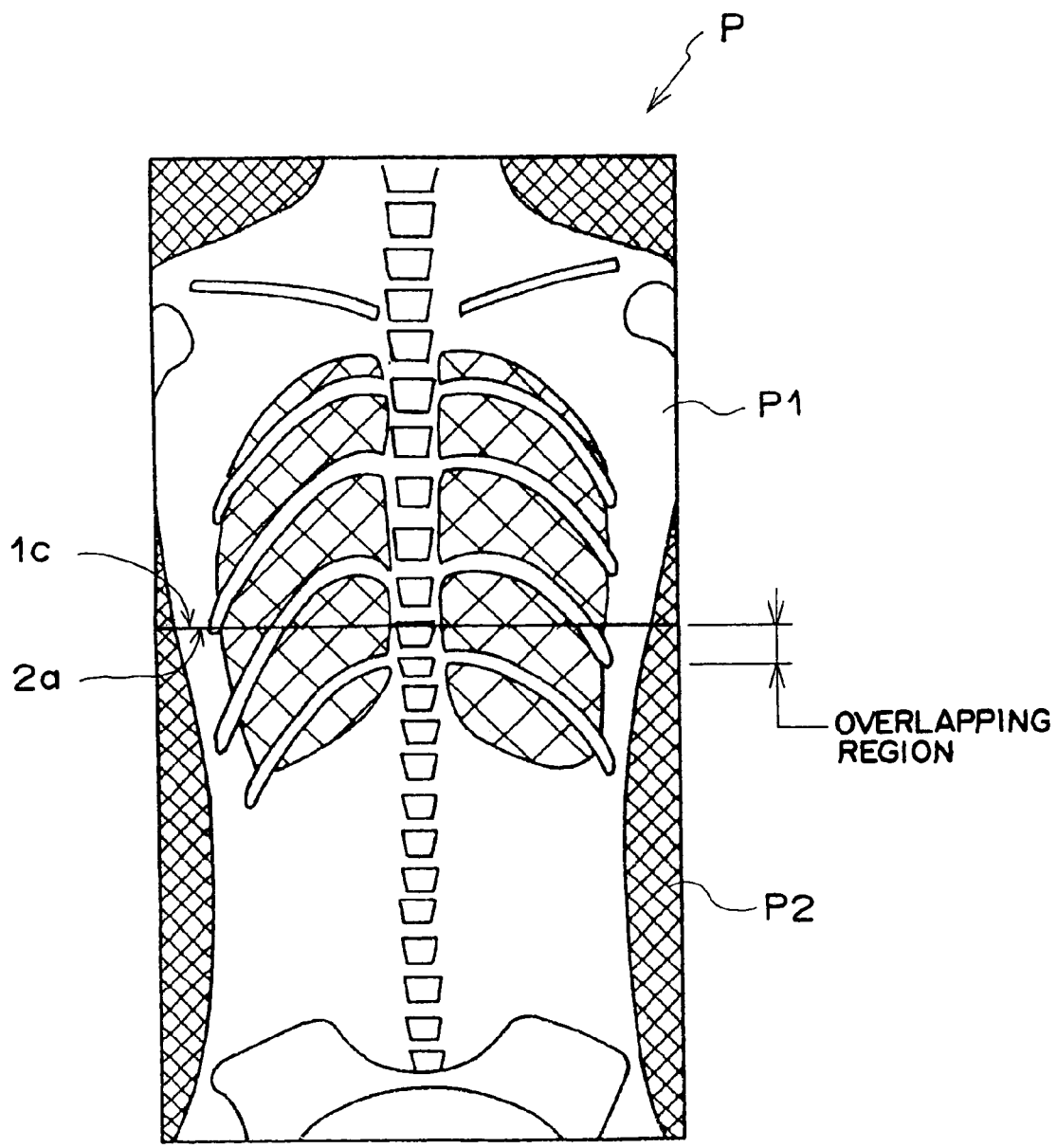
FIG. 5 is a schematic view showing a radiation image obtained from connection processing performed in the embodiment of FIG. 1.

The first radiation image signal S1 and the second radiation image signal S2, which respectively represent the first radiation image P1 and the second radiation image P2, the positions of which have been matched with each other by the position matching means 14, are fed into the connection processing means 15. The connection processing means 15 performs the connection processing on the first radiation image signal S1 and the second radiation image signal S2 and forms the radiation image signal S representing the reconstructed radiation image P shown in FIG. 5. The radiation image signal S is fed from the connection processing means 15 into an external filing apparatus, or the like.

As described above, with this embodiment of the radiation image processing apparatus in accordance with the present invention, even if image patterns of markers for position matching are not recorded on the two stimulable phosphor sheets 31 and 32 associated with each other such that the portions of them overlap each other, the positions of the two radiation images P1 and P2 having been read out respectively from the two stimulable phosphor sheets 31 and 32 can be accurately matched with each other. In this manner, the single radiation image P can be reconstructed from the two radiation images P1 and P2.

In the embodiment described above, occurrence of a deviation in position between the two stimulable phosphor sheets in the direction, along which the boundary line image pattern 1c extends, is not taken into consideration. In cases where a deviation in position in the direction, along which the boundary line image pattern 1c extends, occurs between the two stimulable phosphor sheets, besides the boundary line image pattern 1c formed by an edge 32a of the second stimulable phosphor sheet 32, a boundary line image pattern due to one of the two side edges adjacent to the edge 32a is formed in the first radiation image P1 having been read out from the first stimulable phosphor sheet 31. Therefore, in such cases, the position matching means 14 may perform the position matching by utilizing the boundary line image pattern 1c and the boundary line image pattern due to one of the two side edges adjacent to the edge 32a.

Also, in the embodiment described above, processing is performed on the assumption that it has been recognized previously that the boundary line image pattern 1c is present in the first radiation image P1, i.e. that the first stimulable phosphor sheet 31 is located on the side remoter from the object than the second stimulable phosphor sheet 32 is. In cases where it is not known previously which one of the stimulable phosphor sheets 31 and 32 is located on the side remoter from the object than the other is, the boundary line image pattern is not necessarily located in the first radiation image P1, and it may occur that the boundary line image pattern is located in the second radiation image P2.

Therefore, in such cases, by the utilization of the effects of the boundary line image pattern detecting means 13 described above, the calculation of the evaluation value M may be made by the boundary line image pattern detecting means 13 with respect to both the radiation images P1 and P2. In this manner, it may be specified whether the boundary line image pattern is located in the radiation image P1 or the radiation image P2.

Specifically, as illustrated in FIG. 6, the radiation image signals S1 and S2 respectively representing the radiation images P1 and P2 are fed into the boundary line image pattern detecting means 13 having the effects described above. The calculation of the evaluation value M for each line described above is made with respect to each of the radiation image signals S1 and S2. With respect to each of the radiation image signals S1 and S2, among the evaluation values M for the respective lines, the evaluation value M whose absolute value is largest is taken as the evaluation value |M|max. The boundary line image pattern detecting means 13 compares the evaluation value |M|max with respect to the radiation image signal S1 and the evaluation value |M|max with respect to the radiation image signal S2 and specifies that the boundary line image pattern is located in the radiation image represented by one of the radiation image signals S1 and S2, which is associated with the larger evaluation value |M|max.

More specifically, as for the radiation image in which the boundary line image pattern is located, the evaluation value M becomes biased to either one of the positive (+1) direction and the negative (−1) direction over the entire range of the horizontal line (extending in the direction indicated by the arrow X in FIG. 4A) along which the boundary line image pattern is located and which lies between pixels corresponding to the fourth pixel and the fifth pixel of the filter f. Therefore, the absolute value |M| of the total evaluation value M obtained for the entire line becomes markedly larger than that obtained for the radiation image in which no boundary line image pattern is located. As for the radiation image in which no boundary line image pattern is located, there is no image area at which the evaluation value M becomes biased to either one of the positive direction and the negative direction over the entire range of one line, and the positive value, the negative value, and the value of zero occur at random along the line. Therefore, the absolute value |M| of the total evaluation value M obtained for the entire line becomes smaller than that obtained for the radiation image in which the boundary line image pattern is located.

With respect to the radiation image P1 or P2 having been specified as containing the boundary line image pattern, the boundary line image pattern detecting means 13 performs the detection of the boundary line image pattern in accordance with the evaluation value M described above. In such cases, it should be noticed that whether the evaluation value M takes a positive value or a negative value becomes reversed between when the boundary line image pattern is located in the first radiation image P1 and when the boundary line image pattern is located in the second radiation image P2. Specifically, in FIG. 2, in cases where the two adjacent stimulable phosphor sheets 31 and 32 overlap each other such that the lower stimulable phosphor sheet 32 is remoter from the object than the upper stimulable phosphor sheet 31 is, the boundary line image pattern is formed at the upper area of the radiation image P2 having been read out from the lower stimulable phosphor sheet 32. In such cases, in accordance with Logical Expression (1) shown above, it can be detected that the boundary line image pattern is located between pixels corresponding to the fourth pixel k2 and the fifth pixel k3 of the filter f along a line, on which the evaluation value M takes a negative value and the absolute value of the evaluation value M is largest.

In the manner described above, the processing for detecting the boundary line image pattern is performed on each of the two radiation image signals S1 and S2 respectively representing the two radiation images P1 and P2. In accordance with the results of the processing for detecting the boundary line image pattern, it is specified which one of the stimulable phosphor sheets 31 and 32 was located on the side remote from the object in the image recording operation. The processing performed in this manner is efficient for automatically performing the connection processing on the radiation images.

When the first radiation image signal S1 and the second radiation image signal S2 are detected respectively from the first stimulable phosphor sheet 31 and the second stimulable phosphor sheet 32 in a radiation image read-out apparatus (not shown), it may occur that the image information having been stored at the edge area of each stimulable phosphor sheet cannot be read out perfectly. In such cases, if the second radiation image P2 has been recorded on the second stimulable phosphor sheet 32 as illustrated in FIG. 7A, the image information stored within an unreadable edge area, which extends over a length m from the edge 2a of the second radiation image P2 having been recorded on the second stimulable phosphor sheet 32, will be lost. As a result, as illustrated in FIG. 7B, a second radiation image P2, which has an edge 2a' at the position shifted by the length m from the edge 2a toward the center region of the second radiation image P2, is obtained from the image read-out operation. The second radiation image signal S2 representing the thus obtained second radiation image P2 is stored in the second memory 12.

In such cases, if the position matching means 14 performs the position matching processing such that the edge 2a' of the second radiation image P2 having thus been read out coincides with the boundary line image pattern 1c in the first radiation image P1, and if the connection processing means 15 performs the connection processing on the first radiation image P1 and the second radiation image P2, the positions of which have thus been matched with each other, in order to reconstruct the radiation image P, a reconstructed radiation image P will be obtained, which lacks the image information corresponding to the unreadable edge area and having been lost in the image read-out operation.

Figure 8:
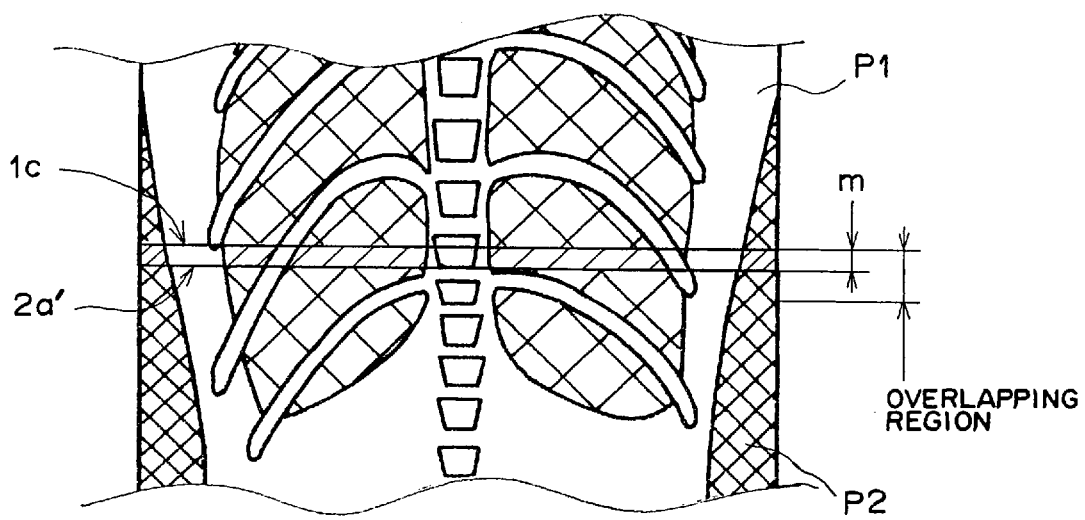
FIG. 8 is a schematic view showing a radiation image obtained from connection processing performed on the first radiation image, which is shown in FIG. 3A, and the second radiation image, which is shown in FIG. 7B and in which part of the image information stored at the overlapping area of the second stimulable phosphor sheet has been lost.

Therefore, in cases where the radiation image read-out apparatus cannot perfectly read out the image information having been recorded at the edge area of each stimulable phosphor sheet, as illustrated in FIG. 8, the position matching means 14 may perform the position matching processing such that the position of the edge 2a' of the second radiation image P2 coincides with a position in the first radiation image P1, which position is shifted from the position of the boundary line image pattern 1c in the first radiation image P1 into the overlapping region of the first radiation image P1 by the distance corresponding to the length m of the unreadable edge area.

In such cases, as for the long, narrow region having the length m from the boundary line image pattern 1c, which region is part of the overlapping region, the connection processing means 15 may employ the corresponding image signal components of the first radiation image signal S1. The long, narrow region having the length m from the boundary line image pattern 1c, for which the corresponding image signal components of the first radiation image signal S1 are employed, is part of the overlapping region corresponding to the overlapping area of the first stimulable phosphor sheet 31, upon which the second stimulable phosphor sheet 32 overlapped in the image recording operation. Therefore, the image density of the long, narrow region becomes lower than the image density of the other image region. Accordingly, the connection processing means 15 may perform correction processing, e.g. uniform shifting of the image density, such that the image density of the long, narrow region, for which the corresponding image signal components of the first radiation image signal S1 have been employed, approximately coincides with the image density of the other region.

An embodiment of the second radiation image processing apparatus for carrying out the second connection processing method for radiation images in accordance with the present invention will be described hereinbelow.

Figure 10A:
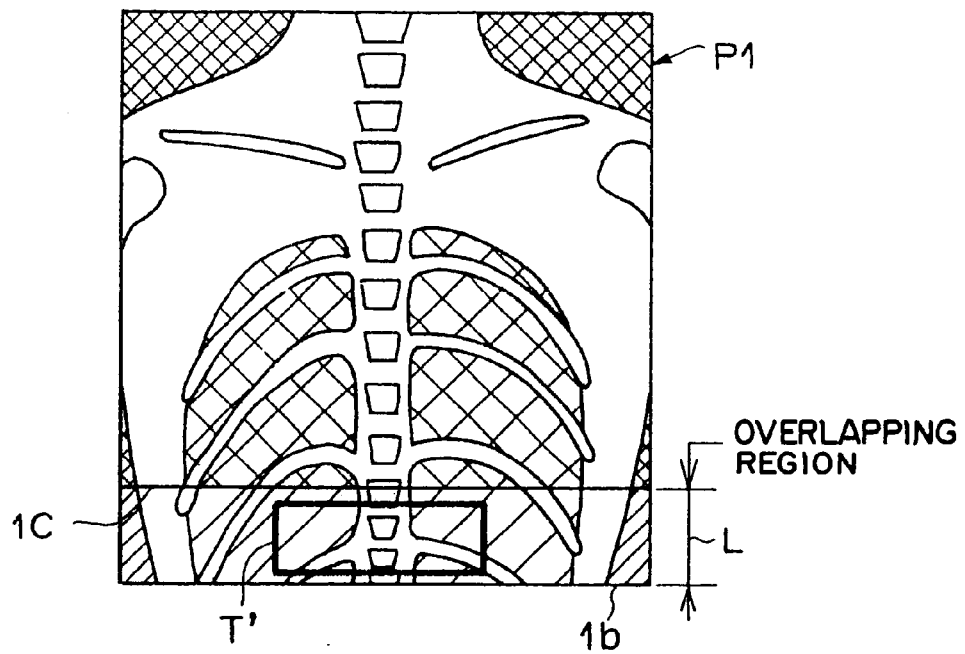
FIG. 10A is a schematic view showing the first radiation image having been read out from the first stimulable phosphor sheet, which is one of the two adjacent stimulable phosphor sheets shown in FIG. 2 and which is located on the side remote from the object.
Figure 10B:
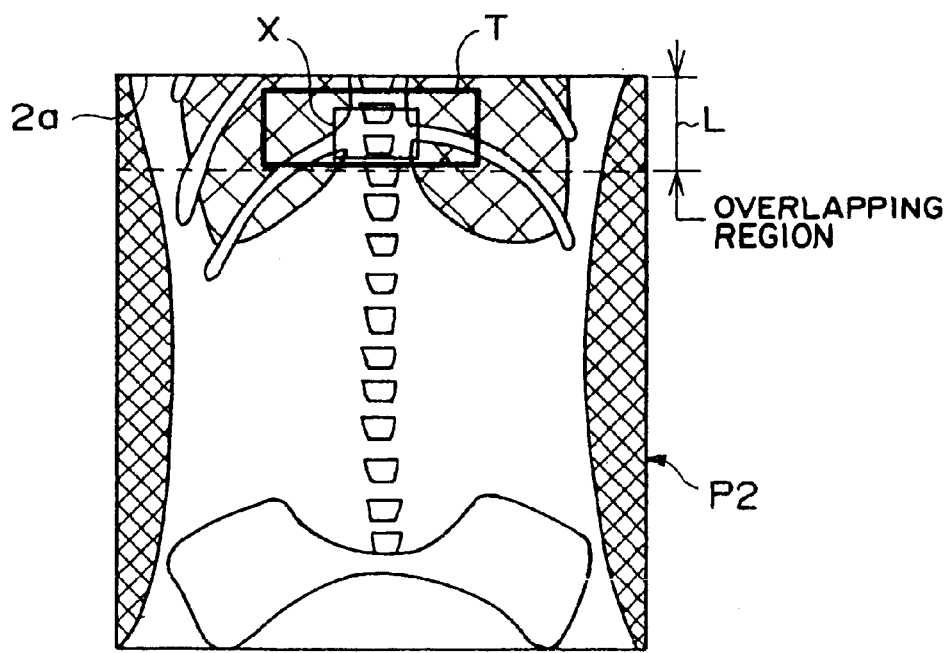
FIG. 10B is a schematic view showing the second radiation image having been read out from the other second stimulable phosphor sheet shown in FIG. 2, which is located on the side close to the object.

FIG. 9 is a block diagram showing the embodiment of the second radiation image processing apparatus for carrying out the second connection processing method for radiation images in accordance with the present invention. FIG. 10A is a schematic view showing the first radiation image having been read out from the first stimulable phosphor sheet, which is one of the two adjacent stimulable phosphor sheets shown in FIG. 2 and which is located on the side remote from the object. FIG. 10B is a schematic view showing the second radiation image having been read out from the other second stimulable phosphor sheet shown in FIG. 2, which is located on the side close to the object. The first and second radiation images shown in FIGS. 10A and 10B are subjected to connection processing performed in the embodiment of FIG. 9.

In the embodiment of the second radiation image processing apparatus in accordance with the present invention, as illustrated in FIG. 2, the single radiation image P of the object is recorded on the two adjacent stimulable phosphor sheets 31 and 32 associated with one another such that the portions of the stimulable phosphor sheets 31 and 32 overlap each other. The first radiation image P1 is read out from the first stimulable phosphor sheet 31 located on the side remote from the object, and the second radiation image P2 is read out from the second stimulable phosphor sheet 32 located on the side close to the object. Also, the connection processing is performed on the first radiation image signal S1, which represents the first radiation image P1, and the second radiation image signal S2, which represents the second radiation image P2, such that the radiation image P of the object is reconstructed from the first radiation image P1 and the second radiation image P2. The radiation image processing apparatus comprises overlapping region detecting means 111 for detecting the overlapping region of the first radiation image P1, which overlapping region corresponds to the overlapping area of the first stimulable phosphor sheet 31, and the overlapping region of the second radiation image P2, which overlapping region corresponds to the overlapping area of the second stimulable phosphor sheet 32. The radiation image processing apparatus also comprises template setting means 112 for setting, as a template T, a rectangular subregion of the second radiation image P2 having been read out from the second stimulable phosphor sheet 32 located on the side close to the object, which rectangular subregion contains a feature image pattern X having been recorded within the overlapping region detected by the overlapping region detecting means 111. The radiation image processing apparatus further comprises template matching means 113 for searching a subregion T' of the first radiation image P1 having been read out from the first stimulable phosphor sheet 31, which sub region T' coincides with the template T. The subregion T' is searched within the overlapping region having been detected by the overlapping region detecting means 111. The radiation image processing apparatus still further comprises position matching means 114 for performing matching of positions of the first radiation image P1 and the second radiation image P2 with each other, such that the subregion T' having been obtained from the searching and the template T coincide with each other. The radiation image processing apparatus also comprises connection processing means 115 for performing the connection processing on the first radiation image P1 and the second radiation image P2, the positions of which have been matched with each other by the position matching means 114, and thereby forming the single radiation image P. (Specifically, the connection processing is performed on the first radiation image signal S1 and the second radiation image signal S2, which respectively represent the first radiation image P1 and the second radiation image P2, the positions of which have been matched with each other by the position matching means 114, and the radiation image signal S representing the single radiation image P is thereby formed.)

The overlapping region detecting means 111 detects the boundary line image pattern 1c of the overlapping region of the first radiation image P1 having been read out from the first stimulable phosphor sheet 31, the overlapping region corresponding to the overlapping area of the first stimulable phosphor sheet 31, which overlapping area overlaps the overlapping area of the second stimulable phosphor sheet 32. The boundary line image pattern is detected in accordance with the first radiation image signal S1. The overlapping region detecting means 111 then detects, as the overlapping region of the first radiation image P1, the range of a distance L from the boundary line image pattern 1c in the first radiation image P1 to the edge (the lower edge) 1b of the first radiation image P1 on the side of the overlapping region. Also, as the overlapping region of the second radiation image P2, the overlapping region detecting means 111 detects the range of the distance L from the edge (the upper edge) 2a of the second radiation image P2 on the side of the overlapping region, which distance L is equal to the distance L from the boundary line image pattern 1c in the first radiation image P1 to the edge 1b of the first radiation image P1 on the side of the overlapping region.

The detection of the boundary line image pattern 1c, which appears in the first radiation image P1, in accordance with the first radiation image signal S1 is performed in the same manner as the detection technique employed in the boundary line image pattern detecting means 13 in the embodiment of FIG. 1.

The template setting means 112 stores previously a detection algorithm for automatically detecting the feature image pattern X having been recorded within the overlapping region of the second radiation image P2, which overlapping region has been detected by the overlapping region detecting means 111. By way of example, the feature image pattern X may be a bone image pattern having a characteristic shape (particularly, an edge area of the bone image pattern), an image pattern of ribs intersecting with each other (particularly, an edge area of the image pattern), or a lung image pattern (particularly, an edge area of the lung image pattern). The template setting means 112 detects the feature image pattern X in accordance with the detection algorithm. Also, the template setting means 112 stores previously a template setting algorithm for setting a rectangular local area limited region, which contains a neighboring region of the detected feature image pattern X, as the template T. The template setting means 112 automatically sets the template T in accordance with the template setting algorithm.

However, the detection of the feature image pattern X and the setting of the template T need not necessarily be performed automatically. For example, the operator may see the second radiation image P2, which is displayed on a display device, such as a cathode ray tube (CRT) display device, and may find the feature image pattern X within the overlapping region of the displayed second radiation image P2. The operator may then manually set the template T so as to surround the found feature image pattern X by utilizing an interface, such as a touch panel or a mouse device.

By way of example, in cases where position matching markers formed from a material having a low radiation transmittance are located at the overlapping areas of the two adjacent stimulable phosphor sheets 31, 32 and the image recording operation is performed in this state, the marker image patterns appearing within each of the overlapping regions of the two radiation images P1 and P2 may be employed as the feature image pattern X.

The connection processing means 115 performs the connection processing on the first radiation image signal S1 and the second radiation image signal S2, which respectively represent the first radiation image P1 and the second radiation image P2, the positions of which have been matched with each other by the position matching means 114. In the connection processing, as for the overlapping regions of the first radiation image P1 and the second radiation image P2, the image signal components of the second radiation image signal S2 representing the second radiation image P2, which correspond to the overlapping region of the second radiation image P2, are employed. As for the non-overlapping region of the first radiation image P1, the image signal components of the first radiation image signal S1, which correspond to the non-overlapping region of the first radiation image P1, are employed. Also, as for the non-overlapping region of the second radiation image P2, the image signal components of the second radiation image signal S2, which correspond to the non-overlapping region of the second radiation image P2, are employed.

How this embodiment of the second radiation image processing apparatus in accordance with the present invention operates will be described hereinbelow.

Firstly, as illustrated in FIG. 2, the radiation image P of the object is recorded on the first stimulable phosphor sheet 31 and the second stimulable phosphor sheet 32. The first radiation image P1 is read out from the first stimulable phosphor sheet 31, and the second radiation image P2 is read out from the second stimulable phosphor sheet 32. The two radiation image signals S1 and S2 representing the first radiation image P1 and the second radiation image P2 respectively are fed into the overlapping region detecting means 111.

In the manner described above, in accordance with the first radiation image signal S1, the overlapping region detecting means 111 detects the boundary line image pattern 1c of the overlapping region of the first radiation image P1, the overlapping region corresponding to the overlapping area of the first stimulable phosphor sheet 31, which overlapping area overlaps the overlapping area of the second stimulable phosphor sheet 32. As illustrated in FIG. 10A, the overlapping region detecting means 111 then detects, as the overlapping region of the first radiation image P1, the range of the distance L from the boundary line image pattern 1c in the first radiation image P1 to the edge (the lower edge) 1b of the first radiation image P1 on the side of the overlapping region. Also, as illustrated in FIG. 10B, as the overlapping region of the second radiation image P2, the overlapping region detecting means 111 detects the range of the distance L from the edge (the upper edge) 2a of the second radiation image P2 on the side of the overlapping region, which distance L is equal to the distance L from the boundary line image pattern 1c in the first radiation image P1 to the edge 1b of the first radiation image P1 on the side of the overlapping region.

After the overlapping region of the first radiation image P1 and the overlapping region of the second radiation image P2 have been detected in the manner described above, as illustrated in FIG. 10B, the template setting means 112 automatically detects the feature image pattern X, which has been recorded within the overlapping region of the second radiation image P2, in accordance with the feature image pattern detection algorithm having been stored previously. Also, the template setting means 112 automatically sets the rectangular local area limited region, which contains the neighboring region of the detected feature image pattern X, as the template T in accordance with the template setting algorithm having been stored previously.

Thereafter, the template matching means 113 searches the subregion T' within the overlapping region of the first radiation image P1, which subregion T' coincides with the template T having been set within the overlapping region of the second radiation image P2. Also, the position matching means 114 performs the matching of positions of the first radiation image P1 and the second radiation image P2 with each other, such that the detected subregion T' of the first radiation image P1 and the template T of the second radiation image P2 coincide with each other. In the position matching processing, when necessary, at least either one of the first radiation image P1 and the second radiation image P2 is rotated such that the subregion T' and the template T coincide with each other. However, in cases where the boundary line image pattern 1c in the first radiation image P1 having been detected during the detection of the overlapping region performed by the overlapping region detecting means 111 has an inclination with respect to the horizontal direction (i.e., the direction along which the upper edge or the lower edge of the first radiation image P1 extends), the template setting means 112 may previously rotate the second radiation image P2 with respect to the first radiation image P1 such that the upper edge 2a of the second radiation image P2 becomes parallel to the boundary line image pattern 1c. The template setting means 112 may then set the template T.

Figure 11:
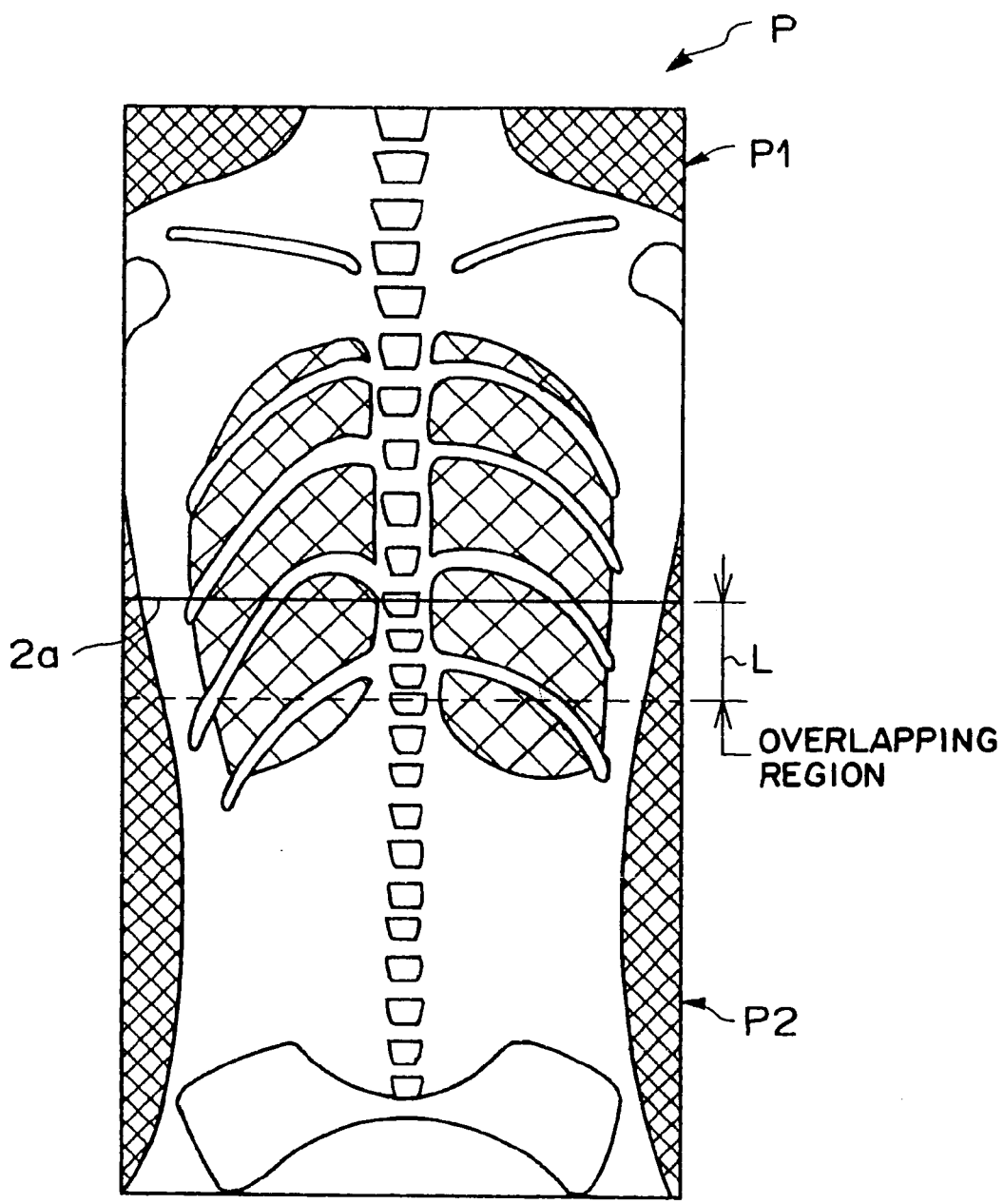
FIG. 11 is a schematic view showing a radiation image obtained from connection processing performed in the embodiment of FIG. 9.

The first radiation image signal S1 and the second radiation image signal S2, which respectively represent the first radiation image P1 and the second radiation image P2, the positions of which have been matched with each other by the position matching means 114, are fed into the connection processing means 115. The connection processing means 115 performs the connection processing on the first radiation image signal S1 and the second radiation image signal S2 and forms the radiation image signal S representing the reconstructed radiation image P shown in FIG. 11. The radiation image signal S is fed from the connection processing means 115 into an external filing apparatus, or the like. In the connection processing, as for the overlapping regions of the first radiation image P1 and the second radiation image P2, the connection processing means 115 employs the image signal components of the second radiation image signal S2 representing the second radiation image P2, which correspond to the overlapping region of the second radiation image P2. As for the non-overlapping region of the first radiation image P1, the connection processing means 115 employs the image signal components of the first radiation image signal S1, which correspond to the non-overlapping region of the first radiation image P1. Also, as for the non-overlapping region of the second radiation image P2, the connection processing means 115 employs the image signal components of the second radiation image signal S2, which correspond to the non-overlapping region of the second radiation image P2.

As described above, with the embodiment of the second radiation image processing apparatus in accordance with the present invention, the subregion of the second radiation image P2, which subregion contains the feature image pattern X having been recorded within the overlapping region corresponding to the area overlapping the first stimulable phosphor sheet 31, is set as the template T. Also, the subregion T' of the first radiation image P1, which subregion T' coincides with the template T, is searched within the overlapping region corresponding to the area overlapping the second stimulable phosphor sheet 32. Thereafter, the matching of positions of the first radiation image P1 and the second radiation image P2 with each other is performed such that the subregion T' having been obtained from the searching and the template T coincide with each other. Therefore, the advantages over the technique, wherein the two adjacent radiation images are merely connected with each other such that any gap may not occur therebetween, can be obtained in that the positions of the two radiation images can be accurately matched with each other and, as a result, a correct radiation image can be reconstructed.

Further, with the embodiment of the second radiation image processing apparatus in accordance with the present invention, the template matching is performed within the limited region, i.e. within the overlapping region. Therefore, the time required to perform the template matching processing can be kept short. Further, since the template matching is performed within the narrow region, the accuracy with which the template matching is performed can be kept high.

In the aforesaid embodiment of the second radiation image processing apparatus in accordance with the present invention, the radiation image in which the boundary line image pattern 1c is not inclined with respect to the horizontal direction is taken as an example. However, the second radiation image processing apparatus in accordance with the present invention is also applicable for a radiation image in which the boundary line image pattern 1c is inclined with respect to the horizontal direction.

Also, in the aforesaid embodiment of the second radiation image processing apparatus in accordance with the present invention, only one template is set. However, such that the accuracy, with which the matching of positions of the two radiation images with each other is performed, may be kept high, a plurality of templates should preferably be set within the overlapping region. Therefore, an embodiment wherein a plurality of templates are set within the overlapping region should preferably be employed.

In the aforesaid embodiment of the second radiation image processing apparatus in accordance with the present invention, processing is performed on the assumption that it has been recognized previously that the boundary line image pattern 1c is present in the first radiation image P1, i.e. that the first stimulable phosphor sheet 31 is located on the side remoter from the object than the second stimulable phosphor sheet 32 is. In cases where it is not known previously which one of the stimulable phosphor sheets 31 and 32 is located on the side remoter from the object than the other is, the boundary line image pattern is not necessarily located in the first radiation image P1, and it may occur that the boundary line image pattern is located in the second radiation image P2.

Therefore, in such cases, by the utilization of the effects of the overlapping region detecting means 111 described above for detecting the boundary line image pattern, the calculation of the evaluation value M with Logical Expression (1) shown above may be made with respect to both the radiation images P1 and P2. In this manner, it may be specified whether the boundary line image pattern is located in the radiation image P1 or the radiation image P2.

Specifically, with respect to each of the received radiation image signals S1 and S2, the overlapping region detecting means 111 makes the calculation of the evaluation value M for each line described above. With respect to each of the radiation image signals S1 and S2, among the evaluation values M for the respective lines, the evaluation value M whose absolute value is largest is taken as the evaluation value |M|max. The overlapping region detecting means 111 compares the evaluation value |M|max with respect to the radiation image signal S1 and the evaluation value |M|max with respect to the radiation image signal S2 and specifies that the boundary line image pattern is located in the radiation image represented by one of the radiation image signals S1 and S2, which is associated with the larger evaluation value |M|max.

More specifically, as for the radiation image in which the boundary line image pattern is located, the evaluation value M becomes biased to either one of the positive (+1) direction and the negative (−1) direction over the entire range of the horizontal line (extending in the direction indicated by the arrow X in FIG. 4A) along which the boundary line image pattern is located and which lies between pixels corresponding to the fourth pixel and the fifth pixel of the filter f. Therefore, the absolute value |M| of the total evaluation value M obtained for the entire line becomes markedly larger than that obtained for the radiation image in which no boundary line image pattern is located. As for the radiation image in which no boundary line image pattern is located, there is no image area at which the evaluation value M becomes biased to either one of the positive direction and the negative direction over the entire range of one line, and the positive value, the negative value, and the value of zero occur at random along the line. Therefore, the absolute value |M| of the total evaluation value M obtained for the entire line becomes smaller than that obtained for the radiation image in which the boundary line image pattern is located.

With respect to the radiation image P1 or P2 having been specified as containing the boundary line image pattern, the overlapping region detecting means 111 performs the detection of the boundary line image pattern in accordance with the evaluation value M described above. In such cases, it should be noticed that whether the evaluation value M takes a positive value or a negative value becomes reversed between when the boundary line image pattern is located in the first radiation image P1 and when the boundary line image pattern is located in the second radiation image P2. Specifically, in FIG. 2, in cases where the two adjacent stimulable phosphor sheets 31 and 32 overlap each other such that the lower stimulable phosphor sheet 32 is remoter from the object than the upper stimulable phosphor sheet 31 is, the boundary line image pattern is formed at the upper area of the radiation image P2 having been read out from the lower stimulable phosphor sheet 32. In such cases, in accordance with Logical Expression (1) shown above, it can be detected that the boundary line image pattern is located between pixels corresponding to the fourth pixel k2 and the fifth pixel k3 of the filter f along a line, on which the evaluation value M takes a negative value and the absolute value of the evaluation value M is largest.

In the manner described above, the processing for detecting the boundary line image pattern is performed on each of the two radiation image signals S1 and S2 respectively representing the two radiation images P1 and P2. In accordance with the results of the processing for detecting the boundary line image pattern, it is specified which one of the stimulable phosphor sheets 31 and 32 was located on the side remote from the object in the image recording operation. The processing performed in this manner is efficient for automatically performing the connection processing on the radiation images.

When the first radiation image signal S1 and the second radiation image signal S2 are detected respectively from the first stimulable phosphor sheet 31 and the second stimulable phosphor sheet 32 in the radiation image read-out apparatus (not shown), it may occur that the image information having been stored at the edge area of each stimulable phosphor sheet cannot be read out perfectly. In such cases, if the second radiation image P2 has been recorded on the second stimulable phosphor sheet 32 as illustrated in FIG. 7A, the image information stored within an unreadable edge area, which extends over a length m from the edge 2a of the second radiation image P2 having been recorded on the second stimulable phosphor sheet 32, will be lost. As a result, as illustrated in FIG. 7B, a second radiation image P2, which has the edge 2a' at the position shifted by the length m from the edge 2a toward the center region of the second radiation image P2, is obtained from the image read-out operation. The second radiation image signal S2 representing the thus obtained second radiation image P2 is fed into the overlapping region detecting means 111.

In such cases, the template matching means 113 performs the template matching, the position matching means 114 then performs the matching of positions of the first radiation image P1 and the second radiation image P2 with each other, and the connection processing means 115 thereafter performs the connection processing on the first radiation image P1 and the second radiation image P2, the positions of which have thus been matched with each other, in order to reconstruct the radiation image P. However, in such cases, the second radiation image signal S2 representing the second radiation image P2 lacks the image signal components representing the image information, which was stored within the unreadable edge area (having the length m) in the overlapping area and which was lost in the image read-out operation. Therefore, as illustrated in FIG. 8, as for the region corresponding to the unreadable edge area having the length m, the connection processing means 115 employs the image signal components of the first radiation image signal S1, which correspond to the image region of the first radiation image P1 having the length m from the boundary line image pattern 1c. In this manner, the connection processing means 115 reconstruct the radiation image P.

In such cases, the long, narrow region having the length m from the boundary line image pattern 1c, which region has been reconstructed by employing the corresponding image signal components of the first radiation image signal S1, is part of the overlapping region corresponding to the overlapping area of the first stimulable phosphor sheet 31, upon which the second stimulable phosphor sheet 32 overlapped in the image recording operation. Therefore, the image density of the long, narrow region becomes lower than the image density of the other image region. Accordingly, the connection processing means 115 may perform correction processing, e.g. uniform shifting of the image density, such that the image density of the long, narrow region, for which the corresponding image signal components of the first radiation image signal S1 have been employed, approximately coincides with the image density of the other region.

What is claimed is:

1. A connection processing method for radiation images, in which a single radiation image of an object is recorded on a plurality of stimulable phosphor sheets associated with one another such that portions of two adjacent stimulable phosphor sheets overlap each other, and in which connection processing is performed on a plurality of radiation images having been read out from the plurality of the stimulable phosphor sheets respectively, such that the single radiation image of the object is reconstructed from the plurality of the read-out radiation images, the method comprising the steps of:

i) detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and ii) performing matching of positions of two radiation images, which have been read out from the two adjacent stimulable phosphor sheets respectively, with each other in accordance with the position of the detected boundary line image pattern in the first radiation image, which has been read out from the first stimulable phosphor sheet located on the side remote from the object, and the position of an edge of an overlapping region of a second radiation image, which has been read out from the second stimulable phosphor sheet located on the side close to the object, the overlapping region of the second radiation image corresponding to the overlapping area of the second stimulable phosphor sheet.

2. A method as defined in claim 1 wherein the detection of the boundary line image pattern is performed by performing edge detection processing on a radiation image signal, which represents the first radiation image having been read out from the first stimulable phosphor sheet located on the side remote from the object.

3. A method as defined in claim 1 or 2 wherein the matching of positions of the two radiation images with each other is performed such that the position of the edge of the overlapping region of the second radiation image, which has been read out from the second stimulable phosphor sheet located on the side close to the object, coincides with the position of the boundary line image pattern in the first radiation image, which has been read out from the first stimulable phosphor sheet located on the side remote from the object.

4. A method as defined in claim 1 or 2 wherein the connection processing on the radiation images having been read out from the two adjacent stimulable phosphor sheets is performed such that image signal components of a radiation image signal representing the second radiation image having been read out from the second stimulable phosphor sheet located on the side close to the object, which image signal components correspond to the overlapping region of the second radiation image, are overwritten upon the image signal components of a radiation image signal representing the first radiation image having been read out from the first stimulable phosphor sheet located on the side remote from the object, which image signal components correspond to the overlapping region of the first radiation image.

5. A method as defined in claim 1 or 2 wherein edge detection processing is performed on each of two radiation image signals representing the two radiation images having been read out from the two adjacent stimulable phosphor sheets, and it is specified, in accordance with the results of the edge detection processing, which one of the two radiation images is the first radiation image having been read out from the first stimulable phosphor sheet located on the side remote from the object or is the second radiation image having been read out from the second stimulable phosphor sheet located on the side close to the object.

6. A radiation image processing apparatus, in which a single radiation image of an object is recorded on a plurality of stimulable phosphor sheets associated with one another such that portions of two adjacent stimulable phosphor sheets overlap each other, and in which connection processing means is provided for performing connection processing on a plurality of radiation images having been read out from the plurality of the stimulable phosphor sheets respectively, such that the single radiation image of the object is reconstructed from the plurality of the read-out radiation images, the apparatus comprising:

i) boundary line image pattern detecting means for detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and ii) position matching means for performing matching of positions of two radiation images, which have been read out from the two adjacent stimulable phosphor sheets respectively, with each other in accordance with the position of the detected boundary line image pattern in the first radiation image, which has been read out from the first stimulable phosphor sheet located on the side remote from the object, and the position of an edge of an overlapping region of a second radiation image, which has been read out from the second stimulable phosphor sheet located on the side close to the object, the overlapping region of the second radiation image corresponding to the overlapping area of the second stimulable phosphor sheet, wherein the connection processing means performs the connection processing on the two radiation images, the positions of which have been matched with each other by the position matching means.

7. An apparatus as defined in claim 6 wherein the boundary line image pattern detecting means detects the boundary line image pattern by performing edge detection processing on a radiation image signal, which represents the first radiation image having been read out from the first stimulable phosphor sheet located on the side remote from the object.

8. An apparatus as defined in claim 6 or 7 wherein the position matching means performs the matching of positions of the two radiation images with each other such that the position of the edge of the overlapping region of the second radiation image, which has been read out from the second stimulable phosphor sheet located on the side close to the object, coincides with the position of the boundary line image pattern in the first radiation image, which has been read out from the first stimulable phosphor sheet located on the side remote from the object.

9. An apparatus as defined in claim 6 or 7 wherein the connection processing means performs the connection processing on the radiation images having been read out from the two adjacent stimulable phosphor sheets such that image signal components of a radiation image signal representing the second radiation image having been read out from the second stimulable phosphor sheet located on the side close to the object, which image signal components correspond to the overlapping region of the second radiation image, are overwritten upon the image signal components of a radiation image signal representing the first radiation image having been read out from the first stimulable phosphor sheet located on the side remote from the object, which image signal components correspond to the overlapping region of the first radiation image.

10. An apparatus as defined in claim 6 or 7 further comprising radiation image specifying means for:

performing edge detection processing on each of two radiation image signals representing the two radiation images having been read out from the two adjacent stimulable phosphor sheets, and specifying, in accordance with the results of the edge detection processing, which one of the two radiation images is the first radiation image having been read out from the first stimulable phosphor sheet located on the side remote from the object or is the second radiation image having been read out from the second stimulable phosphor sheet located on the side close to the object.

11. A connection processing method for radiation images, in which a single radiation image of an object is recorded on a plurality of stimulable phosphor sheets associated with one another such that portions of two adjacent stimulable phosphor sheets overlap each other, and in which connection processing is performed on a plurality of radiation images having been read out from the plurality of the stimulable phosphor sheets respectively, such that the single radiation image of the object is reconstructed from the plurality of the read-out radiation images, the method comprising the steps of:

i) setting at least one subregion within an overlapping region of a radiation image, which has been read out from either one of the two adjacent stimulable phosphor sheets, as a template, the overlapping region corresponding to an overlapping area of the one stimulable phosphor sheet, which overlapping area overlaps an overlapping area of the other stimulable phosphor sheet, ii) searching a subregion, which coincides with the template within an overlapping region of a radiation image, which has been read out from the other stimulable phosphor sheet, the overlapping region corresponding to the overlapping area of the other stimulable phosphor sheet, and iii) performing matching of positions of the two radiation images with each other such that the thus searched subregion and the template coincide with each other.

12. A method as defined in claim 11 wherein the overlapping region of the radiation image having been read out from the one stimulable phosphor sheet and the overlapping region of the radiation image having been read out from the other stimulable phosphor sheet are detected by the steps of:

detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and detecting the overlapping region of the first radiation image and an overlapping region of a second radiation image, which has been read out from the second stimulable phosphor sheet located on the side close to the object, in accordance with the detected boundary line image pattern.

13. A method as defined in claim 12 wherein the detection of the boundary line image pattern is performed by performing edge detection processing on a radiation image signal, which represents the first radiation image having been read out from the first stimulable phosphor sheet located on the side remote from the object.

14. A method as defined in claim 11, 12, or 13 wherein a subregion containing a feature image pattern within the overlapping region of the radiation image, which has been read out from the one stimulable phosphor sheet, is set as the template.

15. A method as defined in claim 14 wherein the feature image pattern is detected automatically in accordance with the image information stored within the overlapping region of the radiation image, which has been read out from the one stimulable phosphor sheet, and the template is set automatically in accordance with the detected feature image pattern.

16. A method as defined in claim 11, 12, or 13 wherein the connection processing on the radiation images having been read out from the two adjacent stimulable phosphor sheets is performed such that image signal components of a radiation image signal representing a second radiation image having been read out from a second stimulable phosphor sheet located on the side close to the object, which image signal components correspond to the overlapping region of the second radiation image, are overwritten upon the image signal components of a radiation image signal representing a first radiation image having been read out from a first stimulable phosphor sheet located on the side remote from the object, which image signal components correspond to the overlapping region of the first radiation image.

17. A method as defined in claim 11, 12, or 13 wherein edge detection processing is performed on each of two radiation image signals representing the two radiation images having been read out from the two adjacent stimulable phosphor sheets, and it is specified, in accordance with the results of the edge detection processing, which one of the two radiation images is a first radiation image having been read out from a first stimulable phosphor sheet located on the side remote from the object or is a second radiation image having been read out from a second stimulable phosphor sheet located on the side close to the object.

18. A radiation image processing apparatus, in which a single radiation image of an object is recorded on a plurality of stimulable phosphor sheets associated with one another such that portions of two adjacent stimulable phosphor sheets overlap each other, and in which connection processing means is provided for performing connection processing on a plurality of radiation images having been read out from the plurality of the stimulable phosphor sheets respectively, such that the single radiation image of the object is reconstructed from the plurality of the read-out radiation images, the apparatus comprising:

i) template setting means for setting at least one subregion within an overlapping region of a radiation image, which has been read out from either one of the two adjacent stimulable phosphor sheets, as a template, the overlapping region corresponding to an overlapping area of the one stimulable phosphor sheet, which overlapping area overlaps an overlapping area of the other stimulable phosphor sheet, ii) template matching means for searching a subregion, which coincides with the template, within an overlapping region of a radiation image, which has been read out from the other stimulable phosphor sheet, the overlapping region corresponding to the overlapping area of the other stimulable phosphor sheet, and iii) position matching means for performing matching of positions of the two radiation images with each other such that the thus searched subregion and the template coincide with each other.

19. An apparatus as defined in claim 18 further comprising overlapping region detecting means for:

detecting a boundary line image pattern of an overlapping region of a first radiation image having been read out from a first stimulable phosphor sheet located on the side remote from the object, which first stimulable phosphor sheet is one of the two adjacent stimulable phosphor sheets, the overlapping region corresponding to an overlapping area of the first stimulable phosphor sheet located on the side remote from the object, which overlapping area overlaps an overlapping area of the other second stimulable phosphor sheet located on the side close to the object, and detecting the overlapping region of the first radiation image and an overlapping region of a second radiation image, which has been read out from the second stimulable phosphor sheet located on the side close to the object, in accordance with the detected boundary line image pattern.

20. An apparatus as defined in claim 19 wherein the overlapping region detecting means detects the boundary line image pattern by performing edge detection processing on a radiation image signal, which represents the first radiation image having been read out from the first stimulable phosphor sheet located on the side remote from the object.

21. An apparatus as defined in claim 18, 19, or 20 wherein the template setting means sets a subregion containing a feature image pattern within the overlapping region of the radiation image, which has been read out from the one stimulable phosphor sheet, as the template.

22. An apparatus as defined in claim 21 wherein the template setting means automatically detects the feature image pattern in accordance with image information stored within the overlapping region of the radiation image having been read out from the one stimulable phosphor sheet, and automatically sets the template in accordance with the detected feature image pattern.

23. An apparatus as defined in claim 18, 19, or 20 wherein the connection processing means performs the connection processing on the radiation images having been read out from the two adjacent stimulable phosphor sheets such that image signal components of a radiation image signal representing a second radiation image having been read out from a second stimulable phosphor sheet located on the side close to the object, which image signal components correspond to the overlapping region of the second radiation image, are overwritten upon the image signal components of a radiation image signal representing a first radiation image having been read out from a first stimulable phosphor sheet located on the side remote from the object, which image signal components correspond to the overlapping region of the first radiation image.

24. An apparatus as defined in claim 18, 19, or 20 further comprising radiation image specifying means for:

performing edge detection processing on each of two radiation image signals representing the two radiation images having been read out from the two adjacent stimulable phosphor sheets, and specifying, in accordance with the results of the edge detection processing, which one of the two radiation images is a first radiation image having been read out from a first stimulable phosphor sheet located on the side remote from the object or is a second radiation image having been read out from a second stimulable phosphor sheet located on the side close to the object.

* * * * *